United States Patent
Kuwae et al.

(10) Patent No.: US 8,610,747 B2
(45) Date of Patent: Dec. 17, 2013

(54) DISPLAY DEVICE OF WORK VEHICLE

(75) Inventors: Junta Kuwae, Sakai (JP); Keisuke Miura, Izumisano (JP); Masaaki Ueda, Sakai (JP); Ikuhiro Uotani, Sakai (JP)

(73) Assignee: Kubota Corporation, Osaka (JP)

( * ) Notice: Subject to any disclaimer, the term of this patent is extended or adjusted under 35 U.S.C. 154(b) by 405 days.

(21) Appl. No.: 12/402,120

(22) Filed: Mar. 11, 2009

(65) Prior Publication Data

US 2009/0244106 A1 Oct. 1, 2009

(30) Foreign Application Priority Data

Mar. 26, 2008 (JP) .................................. 2008-081561
Mar. 26, 2008 (JP) .................................. 2008-081562

(51) Int. Cl.
*G09F 9/35* (2006.01)
*G09F 9/00* (2006.01)
*B60K 35/00* (2006.01)
*B60Q 1/00* (2006.01)

(52) U.S. Cl.
USPC ............ 345/690; 340/461; 340/462; 345/156

(58) Field of Classification Search
USPC .............. 345/156, 690; 348/58; 340/461, 462
See application file for complete search history.

(56) References Cited

U.S. PATENT DOCUMENTS

| | | | |
|---|---|---|---|
| 7,190,390 B2 * | 3/2007 | Hett et al. ........................ | 348/58 |
| 2007/0068381 A1 | 3/2007 | Miura et al. | |
| 2007/0069880 A1 * | 3/2007 | Best et al. ...................... | 340/461 |
| 2007/0132572 A1 * | 6/2007 | Itoh et al. ...................... | 340/462 |
| 2007/0247295 A1 * | 10/2007 | Donath et al. ................ | 340/461 |

FOREIGN PATENT DOCUMENTS

| | | | |
|---|---|---|---|
| DE | 102 11 270 A1 | | 10/2003 |
| DE | 10211270 | * | 10/2003 |
| DE | 10 2005 059 092 A1 | | 6/2007 |
| DE | 10 2006 038 175 A1 | | 2/2008 |
| EP | 0 993 995 A1 | | 4/2000 |
| EP | 0993995 | * | 4/2000 |
| JP | 63077234 U | | 5/1988 |
| JP | 64041914 A | | 2/1989 |
| JP | 2046232 U | | 3/1990 |
| JP | 09062339 A | | 3/1997 |
| JP | 10042671 A | | 2/1998 |
| JP | 10236138 A | | 9/1998 |
| JP | 2001153692 A | | 6/2001 |
| JP | 2002-036911 A | | 2/2002 |
| JP | 2003013472 A | | 1/2003 |
| JP | 2004-333362 A | | 11/2004 |
| JP | 2006016916 A | | 1/2006 |
| JP | 2006138746 A | | 6/2006 |
| JP | 2006256466 A | | 9/2006 |
| JP | 2006336275 A | | 12/2006 |
| JP | 2007092763 A | | 4/2007 |
| JP | 2007121728 A | | 5/2007 |
| JP | 2007239303 A | | 9/2007 |
| WO | 2008/019821 A1 | | 2/2008 |

* cited by examiner

*Primary Examiner* — Quan-Zhen Wang
*Assistant Examiner* — Michael J Eurice
(74) *Attorney, Agent, or Firm* — The Webb Law Firm

(57) ABSTRACT

A display device for a work vehicle, comprising:
  a variable display unit capable of varying display contents; and
  a printed display unit disposed adjacent to the variable display unit; wherein:
  the printed display unit is formed with a background color similar to that of the variable display unit so that the printed display unit appears as a single display unit continuous with the variable display unit.

12 Claims, 22 Drawing Sheets

Fig. 19

| ATTACHMENT AND SYMBOL | | | LEFT VOLUME SWITCH 27L | | RIGHT VOLUME SWITCH 27R | |
|---|---|---|---|---|---|---|
| | | | LEFT | RIGHT | LEFT | RIGHT |
| 1 | TILT BUCKET |  | STOP | STOP | 25% | 25% |
| 2 | BREAKER |  | STOP | STOP | 100% | STOP |
| 3 | CLAM SHELL |  | STOP | STOP | 100% | 100% |
| 4 | AUGER | 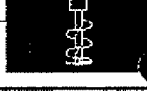 | STOP | STOP | 100% | 100% |
| 5 | GRAPPLE |  | STOP | STOP | 50% | 50% |
| 6 | ROTARY GRAPPLE |  | 25% | 25% | 50% | 50% |
| 7 | BRUSH CUTTER |  | STOP | STOP | 100% | STOP |

Row labels: DA(DA1)/A(A1), DA(DA2)/A(A2), DA(DA3)/A(A3), DA(DA4)/A(A4), DA(DA5)/A(A5), DA(DA6)/A(A6), DA(DA7)/A(A7)

○○% DESCRIBES A REPRESENTATIVE VALUE OF THE FLOW RATE LIMIT

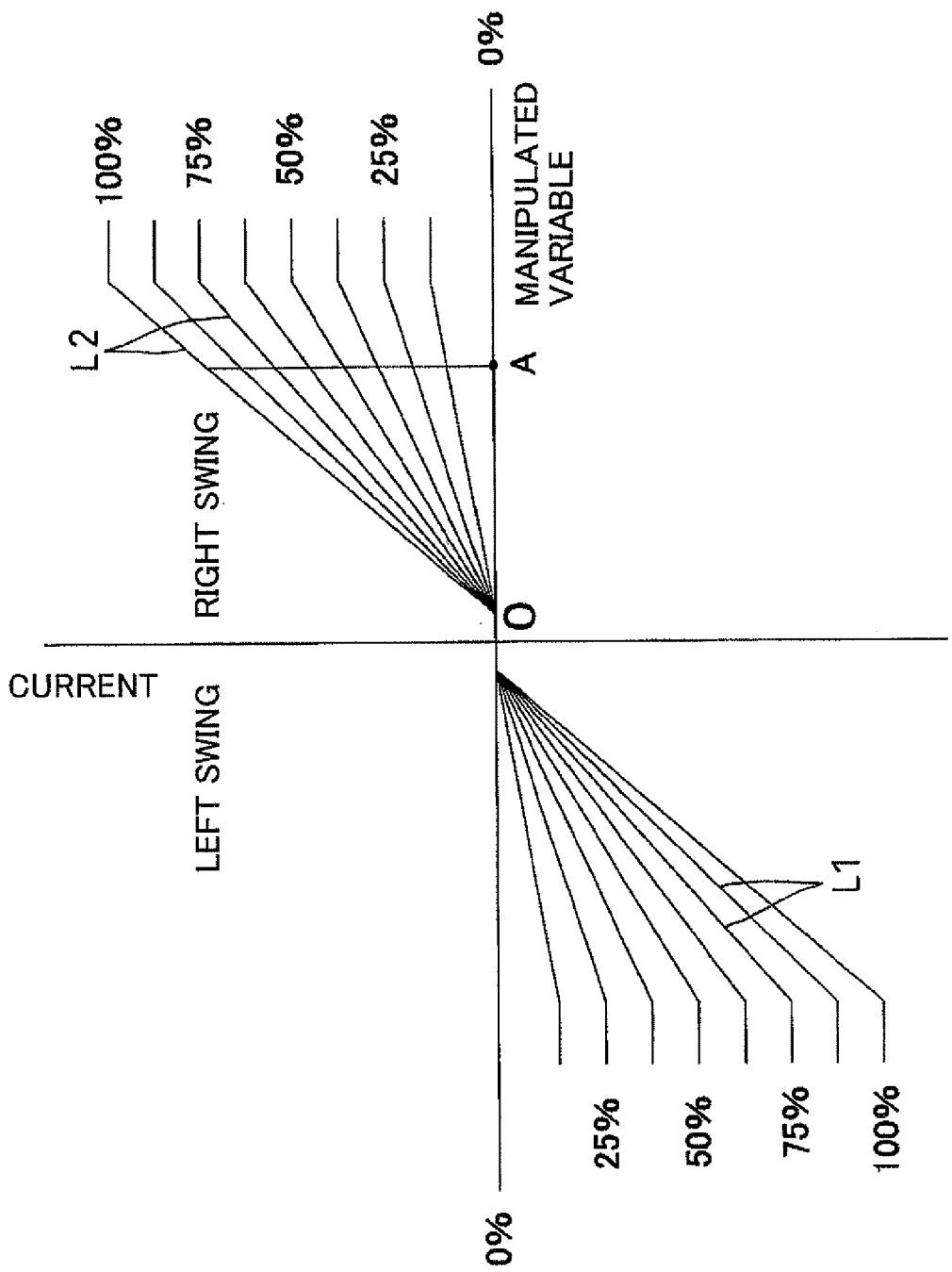

Fig.22
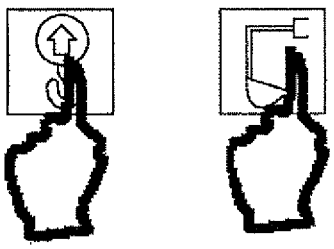
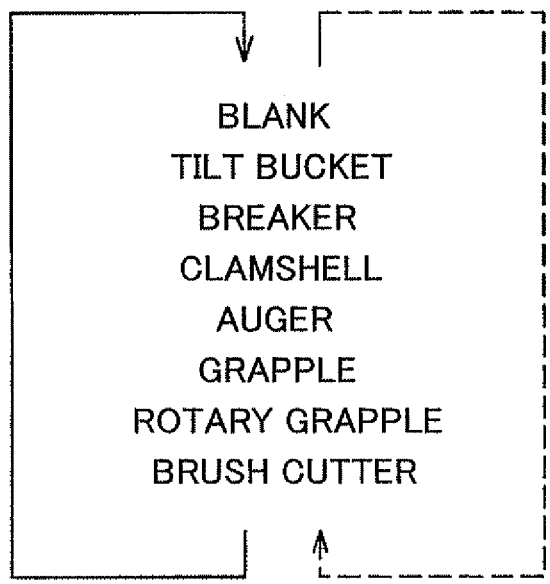
BLANK
TILT BUCKET
BREAKER
CLAMSHELL
AUGER
GRAPPLE
ROTARY GRAPPLE
BRUSH CUTTER
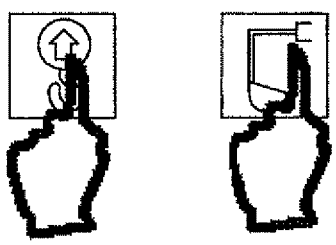

DISPLAY DEVICE OF WORK VEHICLE

BACKGROUND OF THE INVENTION

1. Field of the Invention

The present invention relates to display device for a backhoe or another work vehicle.

2. Description of the Related Art

Backhoes and other work vehicles include those in which a display panel for gauge displays or the like is provided in proximity to the driver seat. This type of conventional display device for a work vehicle includes those in which a liquid crystal display unit (variable display unit) for variably displaying a gauge or the like is provided in a display panel, and a printed display unit for showing a fixed display is provided adjacent to the liquid crystal display unit (for example, JP2006-256466A, JP2007-239303A, JP10-42671A).

However, in the past, the liquid crystal display unit and the printed display unit have had different background colors and the liquid crystal display unit and printed display unit have been clearly distinguishable. This has been a problem in that a liquid crystal display unit of small surface area and a printed display unit of small surface area are aligned in a small space, the overall outward appearance of the display panel is compromised, and an adequate aesthetic appeal cannot be created.

In view of these problems, the present invention is designed so that a variable display unit and a printed display unit adjacent thereto appear as a single continuous large display unit, and an adequate aesthetic appeal and a pleasant outward appearance are created.

SUMMARY OF THE INVENTION

According to an aspect of the present invention, there is provided a display device for a work vehicle comprising a variable display unit capable of varying display contents, and a printed display unit disposed adjacent to the variable display unit, wherein the printed display unit is formed with a background color similar to that of the variable display unit so that the printed display unit appears as a single display unit continuous with the variable display unit.

In the aspect described above, it is preferred that the variable display unit be configured so that a variable display is displayed in a black color on a white background, the printed display unit be formed with a white background similar to the background color of the variable display unit, and black fixed displays be created.

In the aspect described above, a light-blocking printed unit is provided adjacent to the printed display unit; a transparent plate is provided over the light-blocking printed unit, the printed display unit, and the variable display unit; a light-blocking printed element is created on the transparent plate so as to form the light-blocking printed unit; a white background printed element for forming the background color of the printed display unit is created; and a liquid crystal panel is disposed inside the transparent plate in order to form the variable display unit.

In the aspect described above, the light-blocking printed element for forming the light-blocking printed unit and the white background printed element for forming the background color of the printed display unit are placed apart from each other on the front and rear surfaces of the transparent plate.

In the aspect described above, it is preferred that a plurality of button switches be aligned adjacent to the variable display unit, a plurality of switch function displays for showing the respective functions of the button switches be displayed in the vicinity of the variable display unit near the button switches, the switch function displays and the corresponding button switches be misaligned from each other in parallel directions, dividing lines be provided between the button switches, the button switches be disposed between adjacent dividing lines, and the dividing lines be formed so that the switch function displays corresponding to the button switches be positioned above and between the ends of the dividing lines on the side proximal to the variable display unit.

In the aspect described above, it is preferred that indicators corresponding to the button switches be provided, and the indicators be disposed between adjacent dividing lines where the corresponding button switches are also disposed.

In the aspect described above, it is preferred that the dividing lines be parallel to each other and disposed so as to be inclined in relation to the variable display unit.

In the aspect described above, dividing lines are provided between adjacent switch function displays of the variable display unit, and the dividing lines are formed so as to be continuous with the other corresponding dividing lines.

According to the present invention, since the printed display unit is formed with a background color similar to that of the variable display unit so that the printed display unit and the variable display unit appear to be a single continuous display unit, the entire display panel has an improved appearance and an adequate aesthetic appeal because the variable display unit and the printed display unit are combined to appear as one large display unit.

According to the present invention, a plurality of switch function displays and a plurality of corresponding button switches are misaligned from each other in parallel directions, dividing lines are formed between the button switches, the button switches are placed between adjacent dividing lines, and the dividing lines are formed so that the switch function displays corresponding to the button switches are positioned above and between the ends of the adjacent dividing lines on the side proximal to the variable display unit. Therefore, even though the switch function displays of the variable display unit and their corresponding button switches are misaligned from each other in parallel directions, the correspondence relationship between the switch function displays of the variable display unit and the button switches is clear, and the button switches can be operated smoothly without error.

BRIEF DESCRIPTION OF THE DRAWINGS

FIG. 19 is a diagram showing the relationship between the operating members and the attachment;

FIG. 20 is a control map diagram in which the electromagnetic valves are controlled;

FIG. 22 is an explanatory diagram of the actions resulting from operating the button switches.

DESCRIPTION OF THE PREFERRED EMBODIMENTS

An embodiment of the present invention is described hereinbelow with reference to the drawings. FIGS. 1 to 22 show an embodiment of the present invention.

Figure 1:
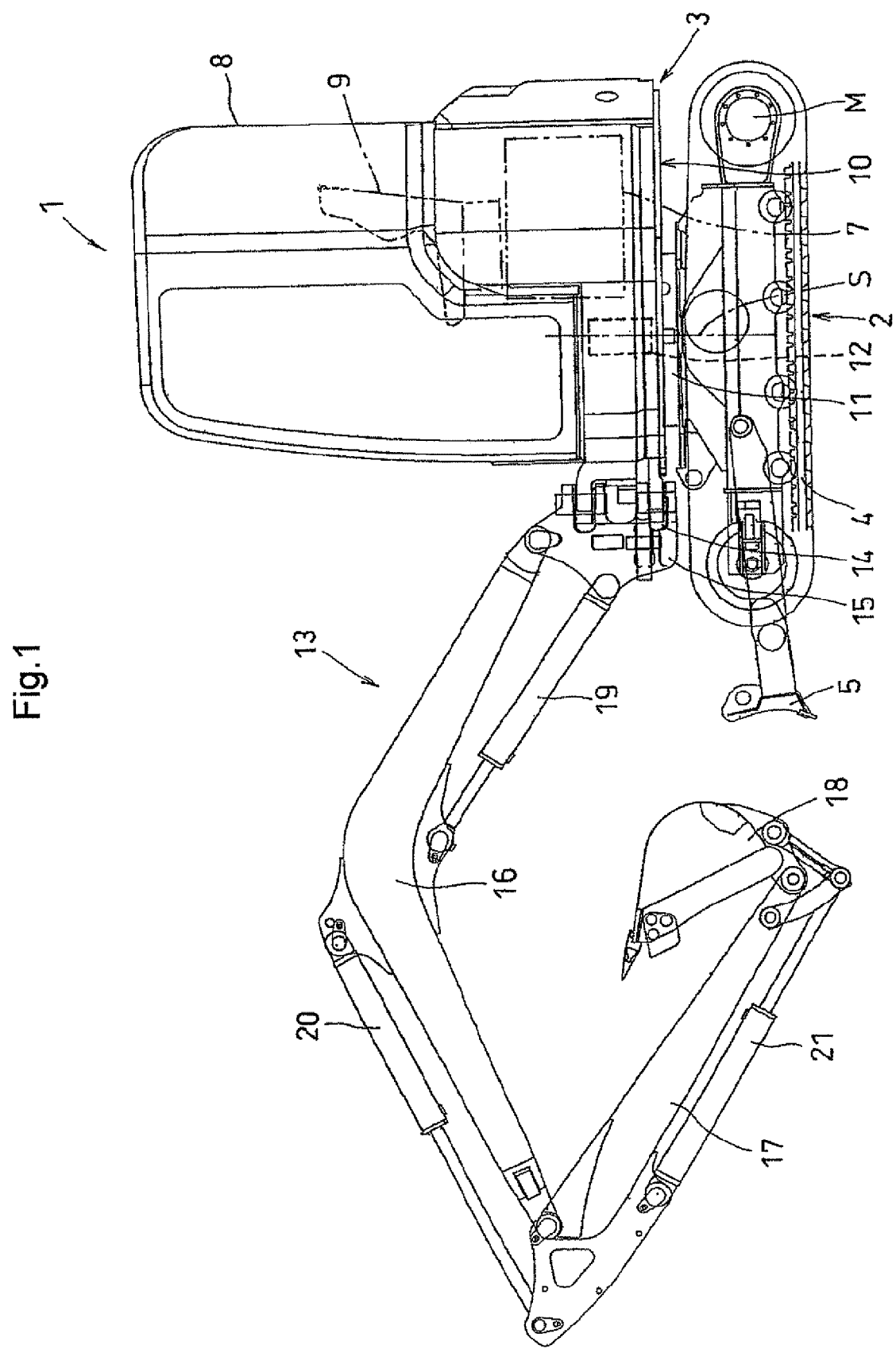
FIG. 1 is a side view of a backhoe showing an embodiment of the present invention.

In FIG. 1, a work vehicle (backhoe) 1 is configured from a bottom travel apparatus 2 and a top swiveling body 3.

The travel apparatus 2 comprises a pair of left and right travel members 4 having rubber track belts, and a crawler-type travel apparatus in which the travel members 4 are driven by a travel motor M is used as the travel apparatus 2. A dozer 5 is provided at the front of the travel apparatus 2.

The swiveling body 3 has a swivel 10 supported on the travel apparatus 2.*so* as to be capable of swiveling left and right around a vertical swivel shaft via a swivel bearing 11, and also has an attachment apparatus 13 (excavating apparatus) provided at the front of the swivel 10; and the swivel 10 is configured so as to be swiveled around a swivel center S by a swivel motor 12. An engine 7, a driver seat 9, a fuel tank, a hydraulic oil tank, and other components are provided on the swivel 10. A cabin 8 enclosing the driver seat 9 is also provided on the swivel 10.

The attachment apparatus 13 comprises a swing bracket 15 supported so as to be capable of swinging to the left and right about a vertical shaft on a support bracket 14 provided at the front of the swivel 10 and offset slightly to the right of the left-to-right center; a boom 16 pivotally mounted on the swing bracket 15 so as to be capable of turning at the proximal end about a left-to-right axial center, and supported so as to be capable of swinging vertically; an arm 17 pivotally mounted at the distal end of the boom 16 so as to be capable of turning about a left-to-right axial center and supported so as to be capable of swinging forward and backward; and a bucket 18 provided at the distal end of the arm 17 so as to be capable of scooping and dumping.

The swing bracket 15 is swung by the extension and retraction of a swing cylinder provided within the swivel 10, the boom 16 is swung by the extension and retraction of a boom cylinder 19 mounted between the boom 16 and the swing bracket 15, the arm 17 is swung by the extension and retraction of an arm cylinder 20 mounted between the arm 17 and the boom 16, and the bucket 18 is made to scoop and dump by the extension and retraction of a bucket cylinder 21 mounted between the bucket 18 and the arm 17.

Instead of the bucket 18, a tilt bucket A1, a breaker A2, a clamshell A3, an auger A4, a grapple A5, a rotary grapple A6, a brush cutter A7, all shown in FIG. 19, or various other attachments (attachment tools) A can be mounted on the distal end of the arm 17. The distal end of the arm 17 is also provided with a hydraulic oil supplier (not shown) for supplying hydraulic oil to actuators 31, 32 designed to operate the attachment A attached in place of the bucket 18. The attachment A may have two actuators 31, 32, or only one of the actuators 31, 32.

The aforementioned swing cylinder, boom cylinder 19, arm cylinder 20, bucket cylinder 21, and other actuators are designed to be operated by hydraulic oil. Specifically, the work vehicle is designed so that the hydraulic oil in the hydraulic oil tank provided on the swivel 10 is supplied to a plurality of control valves 20A, 12A, 19A, 21A, etc. by the hydraulic pumps 35, 36 shown in FIG. 6, and the actuators are operated by feeding hydraulic oil to the actuators via the control valves 20A, 12A, 19A, 21A.

Figure 2:
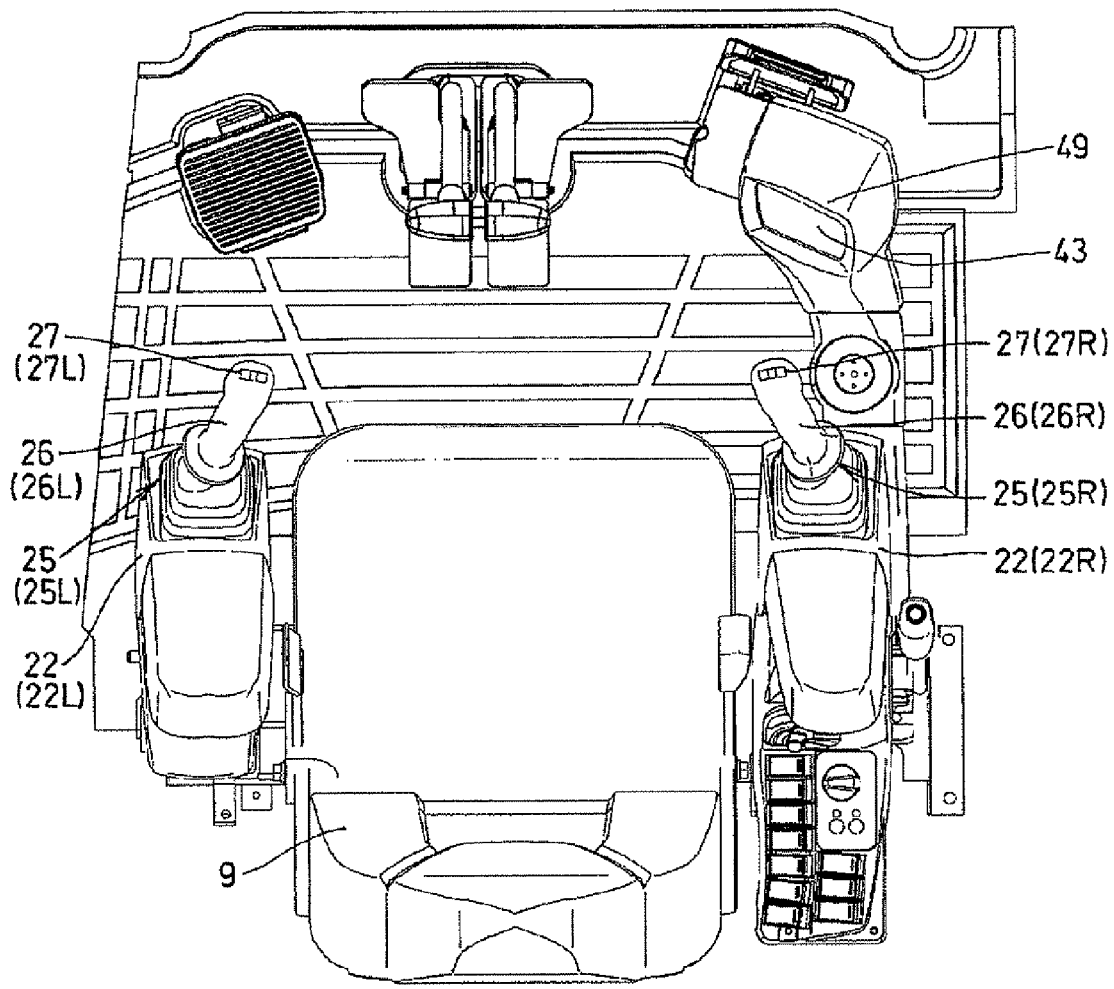
FIG. 2 is a layout view showing the placement of the operating members surrounding the driver seat.

A pair of left and right steering stands 22 (left steering stand 22L, right steering stand 22R) is disposed on the left and right sides of the driver seat 9, as shown in FIG. 2. A pair of left and right operating members 25 (left operating member 25L, right operating member 25R) is provided on the steering stands 22, and the attachment A mounted on the attachment apparatus 13 is operated by the pair of left and right operating members 25 (left operating member 25L, right operating member 25R). The operating members 25 (25L, 25R) have a pair of left and right operating levers 26 (left operating lever 26L, right operating lever 26R), and volume switches (manual operating units) 27 (left volume switch 27L, right volume switch 27R) provided on the grips of the operating levers 26L, 26R. The left operating lever 26L is an operating lever for swiveling and operating the arm, and the right operating lever 26R is an operating lever for the boom and the bucket.

The operating levers 26 (26L, 26R) are supported so as to be capable of swinging forward, backward, left, and right from a neutral position; and the volume switches 27 (27L, 27R) are supported on the grips so as to be capable of swinging to the left and right from a neutral position.

Figure 7:
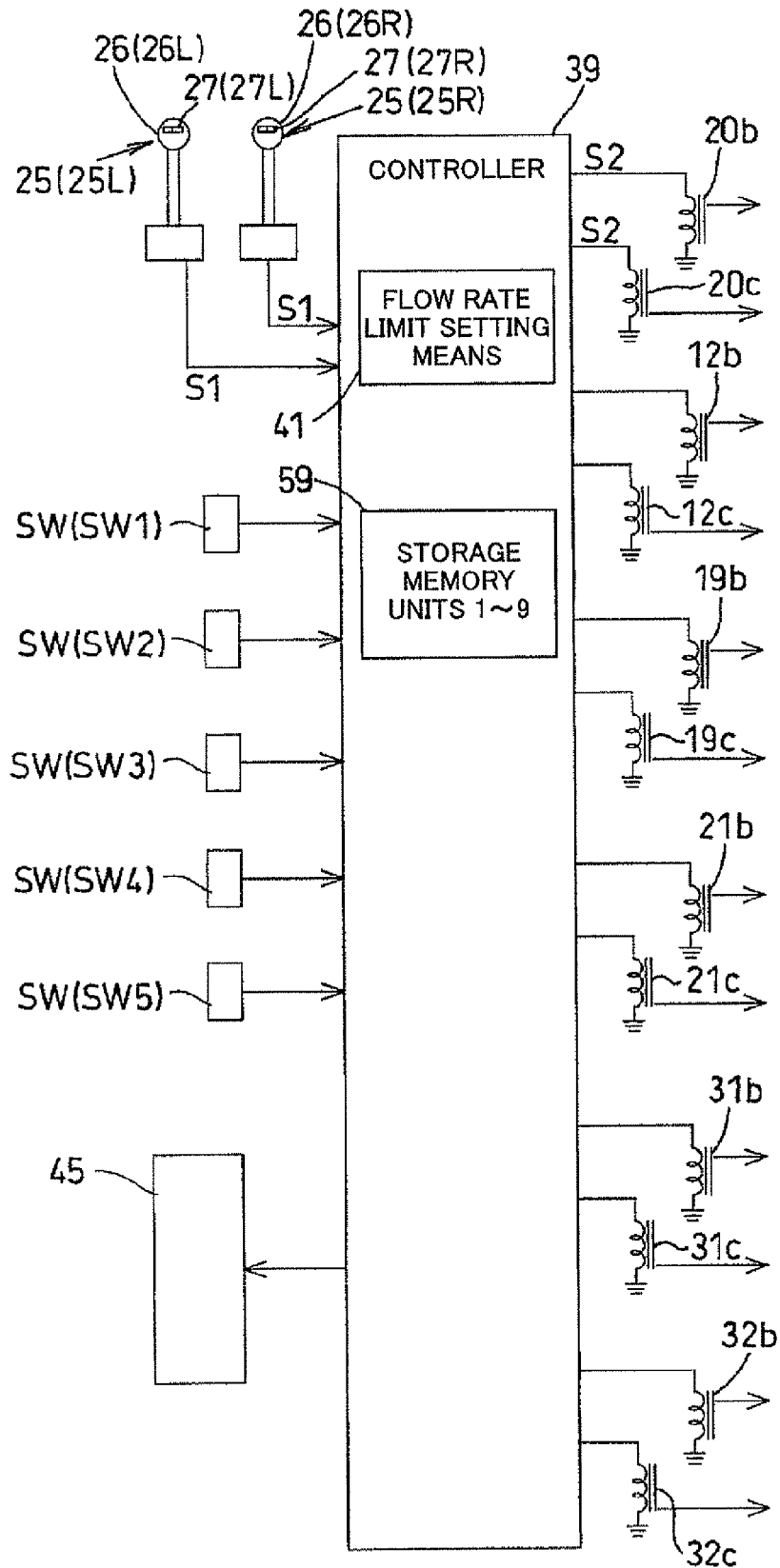
FIG. 7 is a structural diagram of the electric control system.

When the operating levers 26 or the volume switches 27 are operated, their manipulated variables (operation angles) are sensed by a position gauge, sensor, or the like; and the manipulated variables are electrically converted to operation signals and outputted to a controller 39 (see FIG. 7).

Figure 6:
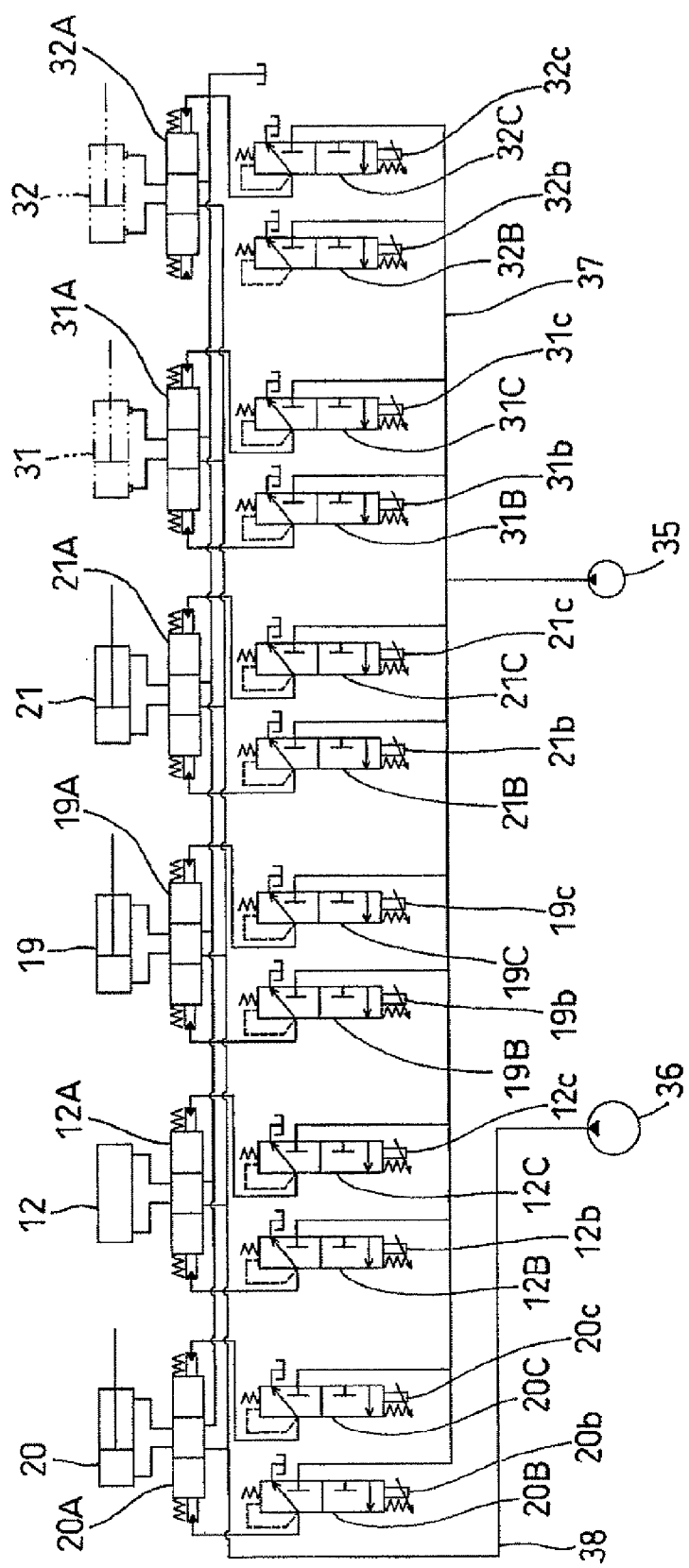
FIG. 6 is a hydraulic circuit drawing.

FIG. 6 shows a hydraulic circuit for driving the arm cylinder 20 and other components. In FIG. 6, 20A is a control valve for the arm cylinder, 12A is a control valve for the swivel motor, 19A is a control valve for the boom cylinder, 21A is a control valve for the bucket cylinder, 31A is a control valve for a first SP (service port) to which the actuator (hydraulic cylinder) 31 of the attachment A is connected, and 32A is a control valve for a second SP (service port) to which the actuator (hydraulic cylinder) 32 of the attachment A is connected. 20B is an electromagnetic valve for swinging the arm forward, 20C is an electromagnetic valve for swinging the arm backward, 12B is an electromagnetic valve for swiveling to the left, 12C is an electromagnetic valve for swiveling to the right, 19B is an electromagnetic valve for raising the boom; 19C is an electromagnetic valve for lowering the boom, 21B is an electromagnetic valve for scooping the bucket, 21C is an electromagnetic valve for dumping the bucket, 31B is a first electromagnetic valve for the first SP, 31C is a second electromagnetic valve for the first SP, 32B is a first electromagnetic valve for the second SP, and 32C is a second electromagnetic valve for the second SP, wherein the valves respectively have solenoids 20b, 20c, 12b, 12c, 19b, 19c, 21b, 21c, 31b, 31c, 32b, 32c. 35 is a first pump, and 36 is a second pump.

Pilot oil is supplied from the first pump 35 to the electromagnetic valves 20B, 20C, 12B, 12C, 19B, 19C, 21B, 21C, 31B, 31C, 32B, 32C via a first oil passage 37; and the pilot pressure applied to the control valves 20A, 12A, 29A, 21A, 31A, 32A is varied by opening and closing the electromagnetic valves 20B, 20C, 12B, 12C, 19B, 19C, 21B, 21C, 31B, 31C, 32B, 32C. Hydraulic oil is supplied from the second pump 36 to the control valves 20A, 12A, 19A, 21A, 31A, 32A via a second oil passage 38; the positions of the control valves 20A, 12A, 19A, 21A, 31A, 32A are determined by the pilot pressure applied to the control valves 20A, 12A, 19A, 21A, 31A, 32A; and hydraulic oil is supplied to the corresponding cylinders 20, 19, 21, the swivel motor 12 (actuator), or the actuators (hydraulic cylinders) 31, 32 of the mounted attachment A.

FIG. 7 shows the configuration of the electric control system. In FIG. 7, 39 is the controller 39 configured from a CPU or the like, and the controller 39 is configured so as to input operation signals S1 from the right operating lever 26R and left operating lever 26L and to output control signals S2 to the solenoids 20b, 20c, 12b, 12c, 19b, 19c, 21b, 21c, 31b, 31c, 32b, 32c of the electromagnetic valves 20B, 20C, 12B, 12C, 19B, 19C, 21B, 21C, 31B, 31C, 32B, 32C.

Specifically, when the right operating lever 26R is swingably operated forward or backward from the neutral position, the manipulated variable (operation angle) is sensed by a position gauge, a sensor, or the like; an electric current or voltage of a strength proportionate to the forward- or backward-manipulated variable is outputted as an operation signal S1 to the controller 39; and the controller 39 outputs a control signal S2 of an electric current or voltage proportionate to the strength of the operation signal S1 inputted from the right operating lever 26R to the solenoid 19b or 19c of the boom-raising electromagnetic valve 19B or the boom-lowering electromagnetic valve 19C. The controller 39 thereby controls the boom cylinder 19 so as to vertically swing the boom 16 at a speed corresponding to the forward- or backward-manipulated variable of the right operating lever 26R via the boom-raising electromagnetic valve 19B or boom-lowering electromagnetic valve 19C. More specifically, if the right operating lever 26R is swung forward from the neutral position, a control signal S2 is inputted with a strength corresponding to the manipulated variable of the solenoid 19b of the boom-lowering electromagnetic valve 19C. The boom-lowering electromagnetic valve 19C then opens according to the forward-manipulated variable of the right operating lever 26R, the result of which is that the pilot pressure of the boom cylinder control valve 19A is controlled, and the boom 16 is lowered at a speed proportionate to the forward-manipulated variable of the right operating lever 26R. If the right operating lever 26R is swingably operated backward from the neutral position, a control signal S2 of a strength corresponding to the manipulated variable is inputted to the solenoid 19c of the boom-raising electromagnetic valve 19B. The boom-raising electromagnetic valve 19B then opens according to the backward-manipulated variable of the right operating lever 26R, the result of which is that the pilot pressure of the boom cylinder control valve 19A is controlled, and the boom 16 is raised at a speed proportionate to the backward-manipulated variable of the right operating lever 26R.

When the right operating lever 26R is swingably operated to the left or right from the neutral position, the manipulated variable (operation angle) is sensed by a position gauge, a sensor, or the like; an electric current or voltage of a strength proportionate to the left- or right-manipulated variable is outputted as an operation signal S1 to the controller 39; and the controller 39 outputs a control signal S2 of an electric current or voltage proportionate to the strength of the operation signal S inputted from the right operating lever 26R to the solenoid 21b or 21c of the bucket-scooping electromagnetic valve 21B or the bucket-dumping electromagnetic valve 21C. The controller 39 thereby controls the bucket cylinder 21 so as to scoop or dump the bucket 18 at a speed corresponding to the left- or right-manipulated variable of the right operating lever 26R via the bucket-scooping electromagnetic valve 21B or the bucket-dumping electromagnetic valve 21C. More specifically, if the right operating lever 26R is swung to the left from the neutral position, a control signal S2 is inputted with a strength corresponding to the manipulated variable of the solenoid 21b of the bucket-scooping electromagnetic valve 21B. The bucket-scooping electromagnetic valve 21B then opens according to the left-manipulated variable of the right operating lever 26R, the result of which is that the pilot pressure of the bucket cylinder control valve 21A is controlled, and the bucket 18 is scooped at a speed proportionate to the left-manipulated variable of the right operating lever 26R. If the right operating lever 26R is swingably operated to the right from the neutral position, a control signal S2 of a strength corresponding to the manipulated variable is inputted to the solenoid 21c of the bucket-dumping electromagnetic valve 21C. The bucket-dumping electromagnetic valve 21C then opens according to the right-manipulated variable of the right operating lever 26R, the result of which is that the pilot pressure of the bucket cylinder control valve 29A is controlled, and the bucket 18 is dumped at a speed proportionate to the right-manipulated variable of the right operating lever 26R.

When the left operating lever 26L is swingably operated forward or backward from the neutral position, the manipulated variable (operation angle) is sensed by a position gauge, a sensor, or the like; an electric current or voltage of a strength proportionate to the forward- or backward-manipulated variable is outputted as an operation signal S1 to the controller 39; and the controller 39 outputs a control signal S2 of an electric current or voltage proportionate to the strength of the operation signal S1 inputted from the left operating lever 26L to the solenoid 20b or 20c of the arm forward-swinging electromagnetic valve 20B or the arm backward-swinging electromagnetic valve 20C. The controller 39 thereby controls the arm cylinder 20 so as to swing the arm 17 forward or backward at a speed corresponding to the forward- or backward-manipulated variable of the left operating lever 26L via the arm forward-swinging electromagnetic valve 20B or the arm backward-swinging electromagnetic valve 20C. More specifically, if the left operating lever 26L is swung forward from the neutral position, a control signal S2 is inputted with a strength corresponding to the manipulated variable of the solenoid 20b of the arm forward-swinging electromagnetic valve 20B, and the arm 17 swings forward at a speed proportionate to the forward-manipulated variable of the left operating lever 26L. If the left operating lever 26L is swung backward from the neutral position, a control signal S2 is inputted with a strength corresponding to the manipulated variable of the solenoid 20c of the arm backward-swinging electromagnetic valve 20C, and the arm 17 swings backward at a speed proportionate to the backward-manipulated variable of the left operating lever 26L.

When the left operating lever 26L is swingably operated to the left or right from the neutral position, the manipulated variable (operation angle) is sensed by a position gauge, a sensor, or the like; an electric current or voltage of a strength proportionate to the left- or right-manipulated variable is outputted as an operation signal S1 to the controller 39; and the controller 39 outputs a control signal S2 of an electric current or voltage proportionate to the strength of the operation signal S1 inputted from the left operating lever 26L to the solenoid 12b or 12c of the left-swiveling electromagnetic valve 12B or the right-swiveling electromagnetic valve 12C. The controller 39 thereby controls the swivel motor 12 so as to swivel the swivel 10 to the left or right at a speed corresponding to the left- or right-manipulated variable of the left operating lever 26L via the left-swiveling electromagnetic valve 12B or the right-swiveling electromagnetic valve 12C. More specifically, if the left operating lever 26L is swung to the left from the neutral position, a control signal S2 is inputted with a strength corresponding to the manipulated variable of the solenoid 12b of the left-swiveling electromagnetic valve 12B, and the swivel 10 swivels to the left at a speed proportionate to the left-manipulated variable of the left operating lever 26L. If the left operating lever 26L is swung to the right from the neutral position, a control signal S2 is inputted with a strength corresponding to the manipulated variable of the solenoid 12c of the right-swiveling electromagnetic valve 12C, and the swivel 10 swivels to the right at a speed proportionate to the right-manipulated variable of the left operating lever 26L.

When the right volume switch 27R is swingably operated to the right from the neutral position (the right end is pressed), the manipulated variable (operation angle) is sensed by a position gauge, a sensor, or the like; an electric current or voltage of a strength proportionate to the right-manipulated variable is outputted as an operation signal S1 to the controller 39; and the controller 39 outputs a control signal S2 of an electric current or voltage proportionate to the strength of the operation signal S1 inputted from the right volume switch 27R to the solenoid 31b or 31c of the first electromagnetic valve 31B for the first SP or the second electromagnetic valve 31C for the first SP. The controller 39 thereby controls the actuator 31 of the attachment A so as to operate the attachment A at a speed corresponding to the right-swung manipulated variable of the right volume switch 27R via the first electromagnetic valve 31B for the first SP or the second electromagnetic valve 31C for the first SP. More specifically, if the right volume switch 27R is swung to the right from the neutral position, a control signal S2 is inputted with a strength corresponding to the manipulated variable of the solenoid 31b of the first electromagnetic valve 31B for the first SP. The first electromagnetic valve 31B for the first SP then opens according to the right-manipulated variable of the right volume switch 27R, the result of which is that the pilot pressure of the control valve 31A for the first SP is controlled, and the attachment A operates at a speed proportionate to the right-manipulated variable of the right volume switch 27R. If the right volume switch 27R is swung to the left from the neutral position (the left end is pressed), a control signal S2 is inputted with a strength corresponding to the manipulated variable of the solenoid 31c of the second electromagnetic valve 31C for the first SP. The second electromagnetic valve 31C for the first SP then opens according to the left-manipulated variable of the right volume switch 27R, the result of which is that the pilot pressure of the control valve 31A for the first SP is controlled, and the attachment A operates at a speed proportionate to the left-manipulated variable of the right volume switch 27R.

When the left volume switch 27L is swingably operated to the right from the neutral position (the right end is pressed), the manipulated variable (operation angle) is sensed by a position gauge, a sensor, or the like; an electric current or voltage of a strength proportionate to the right-manipulated variable is outputted as an operation signal S1 to the controller 39; and the controller 39 outputs a control signal S2 of an electric current or voltage proportionate to the strength of the operation signal S1 inputted from the left volume switch 27L to the solenoid 32b or 32c of the first electromagnetic valve 32B for the second SP or the second electromagnetic valve 32C for the second SP. The controller 39 thereby controls the actuator 32 of the attachment A so as to operate the attachment A at a speed corresponding to the right-swung manipulated variable of the left volume switch 27L via the first electromagnetic valve 32B for the second SP or the second electromagnetic valve 32C for the second SP. More specifically, if the left volume switch 27L is swung to the right from the neutral position, a control signal S2 is inputted with a strength corresponding to the manipulated variable of the solenoid 32b of the first electromagnetic valve 32B for the second SP. The first electromagnetic valve 32B for the second SP then opens according to the right-manipulated variable of the left volume switch 27L, the result of which is that the pilot pressure of the control valve 32A for the second SP is controlled, and the attachment A operates at a speed proportionate to the right-manipulated variable of the left volume switch 27L. If the left volume switch 27L is swung to the left from the neutral position (the left end is pressed), a control signal S2 is inputted with a strength corresponding to the manipulated variable of the solenoid 32c of the second electromagnetic valve 32C for the second SP. The second electromagnetic valve 32C for the second SP then opens according to the left-manipulated variable of the left volume switch 27L, the result of which is that the pilot pressure of the control valve 32A for the second SP is controlled, and the attachment A operates at a speed proportionate to the left-manipulated variable of the left volume switch 27L.

The operation of the volume switches 27 causes the following actions, depending on the type of the mounted attachments A shown in FIG. 19.

Specifically, the actuators 31, 32 of the attachment A are configured so as to operate forward or backward by the supply and drainage of hydraulic oil in one of two directions. If the attachment A mounted on the work vehicle 1 is a tilt bucket A1, then when the right volume switch 27R is swingably operated to the right, the tilt bucket A1 inclines to the right at a speed corresponding to the right-manipulated variable. When the right volume switch 27R is swingably operated to the left, the tilt bucket A1 inclines to the left at a speed corresponding to the left-manipulated variable. The tilt bucket A1 is not actuated even if the left volume switch 27L is operated.

If the attachment A mounted on the work vehicle 1 is a breaker A2, then when the right volume switch 27R is swingably operated to the right, the hammer of the breaker A2 vibrates at a speed corresponding to the left-manipulated variable. The breaker A2 is not actuated even if the right volume switch 27R is swingably operated to the right or if the left volume switch 27L is operated.

If the attachment A mounted on the work vehicle 1 is a clamshell A3, then when the right volume switch 27R is swingably operated to the right, the clamshell A3 opens at a speed corresponding to the right-manipulated variable. When the right volume switch 27R is swingably operated to the left, the clamshell A3 closes at a speed corresponding to the left-manipulated variable. The clamshell A3 is not actuated even if the left volume switch 27L is operated.

If the attachment A mounted on the work vehicle 1 is an auger A4, then when the right volume switch 27R is swingably operated to the right, the auger A4 rotates to the right at a speed corresponding to the right-manipulated variable. When the right volume switch 27R is swingably operated to the left, the auger A4 rotates to the left at a speed corresponding to the left-manipulated variable. The auger A4 is not actuated even if the left volume switch 27L is operated.

If the attachment A mounted on the work vehicle 1 is a grapple A5, then when the right volume switch 27R is swingably operated to the right, the grapple A5 opens at a speed corresponding to the right-manipulated variable. When the right volume switch 27R is swingably operated to the left, the grapple A5 closes (grasps) at a speed corresponding to the left-manipulated variable. The grapple A5 is not actuated even if the left volume switch 27L operates.

If the attachment A mounted on the work vehicle 1 is a rotary grapple A6, then when the right volume switch 27R is swingably operated to the right, the rotary grapple AG opens at a speed corresponding to the right-manipulated variable. When the right volume switch 27R is swingably operated to the left, the rotary grapple A6 closes (grasps) at a speed corresponding to the left-manipulated variable. When the left volume switch 27L is swingably operated to the right, the gripping portion of the rotary grapple A6 rotates to the right at a speed corresponding to the right-manipulated variable, and when the left volume switch 27L is swingably operated to the left, the gripping portion of the rotary grapple A6 rotates to the left at a speed corresponding to the left-manipulated variable.

If the attachment A mounted on the work vehicle 1 is a brush cutter A7, then when the right volume switch 27R is swingably operated to the left, the grass-cutting rotary of the brush cutter A7 rotates at a speed corresponding to the left-manipulated variable. The brush cutter A7 is not actuated even if the right volume switch 27R is swingably operated to the right or if the left volume switch 27L is operated.

The controller 39 is provided with flow rate limit setting means 41 for variably setting maximum flow rate levels ML of hydraulic oil supplied to and drained from the actuators 31, 32 by the operation of the operating members 25, as shown in FIG. 7.

The flow rate limit setting means 41 uses the control map shown in FIG. 20 to variably set the maximum flow rate levels ML of the hydraulic oil supplied to and drained from the actuators 31, 32 by the operation of the operating members 25. FIG. 20 shows a control map of the controller 39 when the volume switches 27 are swung to the left or right from the neutral position.

In FIG. 20, the horizontal axis represents the manipulated variables (operation signals) of the volume switches 27, and the vertical axis represents the electric current or voltage value of the control signals S2 outputted respectively to the first electromagnetic valve 31B for the first SP, the second electromagnetic valve 31C for the first SP, the first electromagnetic valve 31B for the first SP, or the second electromagnetic valve 32C for the second SP. The control map of the controller 39 has conversion lines L1, L2 for converting the manipulated variables of the volume switches 27 into electric current values or voltage values. The controller 39 converts the manipulated variables of the volume switches 27 to electric current values or voltage values substantially proportionate to the manipulated variables on the basis of the conversion lines L1, L2; and outputs these values as control signals S2 to the respective first electromagnetic valve 31B for the first SP, second electromagnetic valve 31C for the first SP, first electromagnetic valve 32B for the second SP, or second electromagnetic valve 32C for the second SP.

The conversion lines L1 to the left of the origin are used to convert the manipulated variables into electric current values or voltage values when the volume switches 27 are swung to the left (left swinging), and the conversion lines L2 to the right of the origin O are used to convert the manipulated variables into electric current values or voltage values when the volume switches 27 are swung to the right (right swinging), as shown in FIG. 20.

Therefore, the controller 39 has individual conversion lines L1, L2 for the left swinging and right swinging of the volume switches 27; and the respective manipulated variables for left swinging and right swinging are separately converted to electric current values or voltage values by the conversion lines L1, L2 corresponding to the swinging direction.

The manipulated variables are positive when the volume switches 27 are operated to the right of the origin O, and the manipulated variables are negative when the volume switches 27 are operated to the left. The controller 39 outputs a positive electric current or voltage when the manipulated variable is positive, and outputs a negative electric current or voltage when the manipulated variable is negative.

The control is performed according to the control map so that a reference level (zero level) is used as a base. When the right volume switch 27R is swung to the right, the greater the electric current or voltage value, the greater the amount by which the first electromagnetic valve 31B for the first SP is opened; and when the right volume switch 27R is swung to the left, the smaller the electric current or voltage value, the greater the amount by which the second electromagnetic valve 31C for the first SP is opened. The control is also performed so that when the left volume switch 27L is swung to the right, the greater the electric current or voltage value, the greater the amount by which the first electromagnetic valve 32B for the second SP is opened; and when the left volume switch 27L is swung to the left, the smaller the electric current or voltage value, the greater the amount by which the second electromagnetic valve 32C for the second SP is opened. Specifically, the first electromagnetic valve 31B for the first SP, the second electromagnetic valve 31C for the first SP, the first electromagnetic valve 32B for the second SP, or the second electromagnetic valve 32C for the second SP is controlled according to the control map so that the closer the electric current or voltage value is to the reference level, the smaller the amount by which the first electromagnetic valve 31B for the first SP, the second electromagnetic valve 31C for the first SP, the first electromagnetic valve 32B for the second SP, or the second electromagnetic valve 32C for the second SP is opened; and the farther the electric current or voltage value is from the reference level, the greater the amount by which the first electromagnetic valve 31B for the first SP, the second electromagnetic valve 31C for the first SP, the first electromagnetic valve 32B for the second SP, or the second electromagnetic valve 32C for the second SP is opened.

The flow rate limit setting means 41 of the controller 39 has an operation signal variation function whereby the electric current values or voltage values corresponding to the manipulated variables of the volume switches 27 are set to one of a plurality of levels. In other words, the flow rate limit setting means 41 of the controller 39 has multiple values for converting one manipulated variable determined by the operation of the volume switches 27 to an electric current value or a voltage value. In the control map in the embodiment, when the manipulated variable is at point A, for example, there are, including 0%, a plurality of (nine) electric current values or voltage values corresponding to this manipulated variable, which are 0%, 12.5%, 25%, 37.5%, 50%, 62.5%, 75%, 87.5%, and 100%.

Specifically, the control map of the controller 39 has a plurality of (nine, for example) conversion lines L1, L2 for converting each of the manipulated variables to an electric current in both left swinging and right swinging.

The conversion lines L1, L2 have different slopes in their middle portions, and the outputted electric current or voltage values gradually increase or decrease as the manipulated variable increases.

To use the conversion lines L2 for the right swinging of the right volume switch 27 as an example, the configuration is designed so that the electric current or voltage value of the 100% conversion line L2 is greatest when the manipulated variable is at point A in the control map, and the less the percentage (level), the smaller the electric current or voltage value converted at point A of the manipulated variable.

A case in which the right volume switch 27R is swung to the right is used as an example to describe the action of the actuators when control is performed according to the control map. When control is performed according to the control map, one of the plurality of conversion lines L2 is selected, as will be described hereinafter.

When the 100% conversion line L2 is selected and the right volume switch 27R is swung to the right, the electric current or voltage value corresponding to the manipulated variable has both great strength and a large amount of change, and the outputted electric current or voltage value and the amount of change thereof both increase even if the volume switch 27 is swung by only a small amount. The result is that the first electromagnetic valve 31B for the first SP opens by a greater amount, the speed by which the first electromagnetic valve 31B for the first SP opens also increases, and the operating speed of the attachment A mounted on the distal end of the arm 17 increases as well.

When the 25% conversion line L2 is selected and the right volume switch 27R is swung to the right, the electric current or voltage value corresponding to the manipulated variable has low strength and a small amount of change, and the electric current or voltage value outputted for this manipulated variable is small, as is the amount of change thereof, even if the right volume switch 27R is swung to the right. The result is that the amount by which the first electromagnetic valve 31B for the first SP opens decreases, the speed by which the first electromagnetic valve 31B for the first SP opens also decreases, and the operating speed of the attachment A mounted on the distal end of the arm 17 decreases as well.

Therefore, when control is performed with conversion lines L1, L2 that have a large slope, the operating speed of the attachment A can be increased. When control is performed with conversion lines L1, L2 that have a small slope, the operating speed of the attachment A can be reduced. When control is performed with the 0% conversion lines L1, L2, the attachment A can be stopped from operating irrespective of the manipulated variable of the volume switch 27.

Therefore, the configuration is designed so that the maximum flow rate levels ML of hydraulic oil supplied to and drained from the actuators 31, 32 of the attachment A mounted on the work vehicle 1 can be separately and variably set in accordance with the operating members 25 for each attachment A by the flow rate limit setting means 41 of the controller 39 by operating the operating members 25L, 25R; i.e., by swingably operating the volume switches 27L, 27R; and an amount of hydraulic oil corresponding to the manipulated variables of the operating members 25 can be supplied to and drained from the actuators 31, 32 of the attachment A to actuate the attachment A (attachment tool) within the range of the maximum flow rate levels ML set by the flow rate limit setting means 41. It is possible to variably set a first maximum flow rate level ML1 of the hydraulic oil supplied to and drained from the actuators 31, 32 in one direction by operating the operating members 25, and a second maximum flow rate level ML2 of the hydraulic oil supplied to and drain from the actuators 31, 32 in the other direction by operating the operating members 25. The setting is performed individually by using the flow rate limit setting means 41 in accordance with the operating members 25 for each attachment A.

A display panel 43 (instrument panel) is provided in front and to the right of the driver seat 9 in the cabin 8, as shown in FIGS. 2 through 5 and FIG. 8. The display panel 43 is provided in front of the right steering stand 22R via a supporting arm 42 extending forward from the right steering stand 22R.

Figure 8:
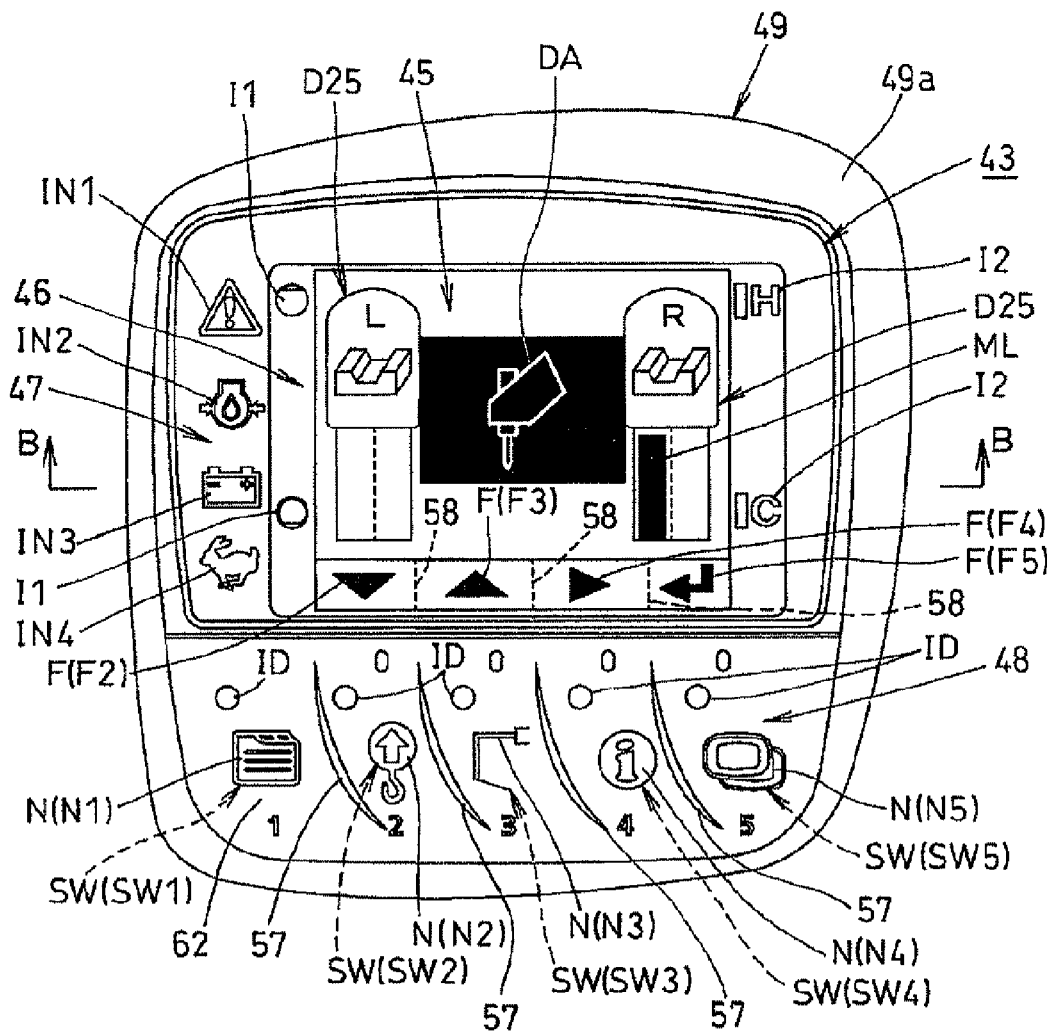
FIG. 8 is a plan view of the display panel portion.

In FIG. 8, the display panel 43 comprises a liquid crystal display unit (variable display unit) 45 in the center, a printed display unit (fixed display unit) 46 adjacent to the liquid crystal display unit 45, a light-blocking printed unit 47 positioned in the external periphery of the printed display unit 46, and a control panel 48 positioned behind the liquid crystal display unit 45. The printed display unit 46 is disposed so as to encircle the external periphery of the liquid crystal display unit 45, and the light-blocking printed unit 47 is disposed so as to enclose the external peripheries of the liquid crystal display unit 45 and the printed display unit 46.

Figure 3:
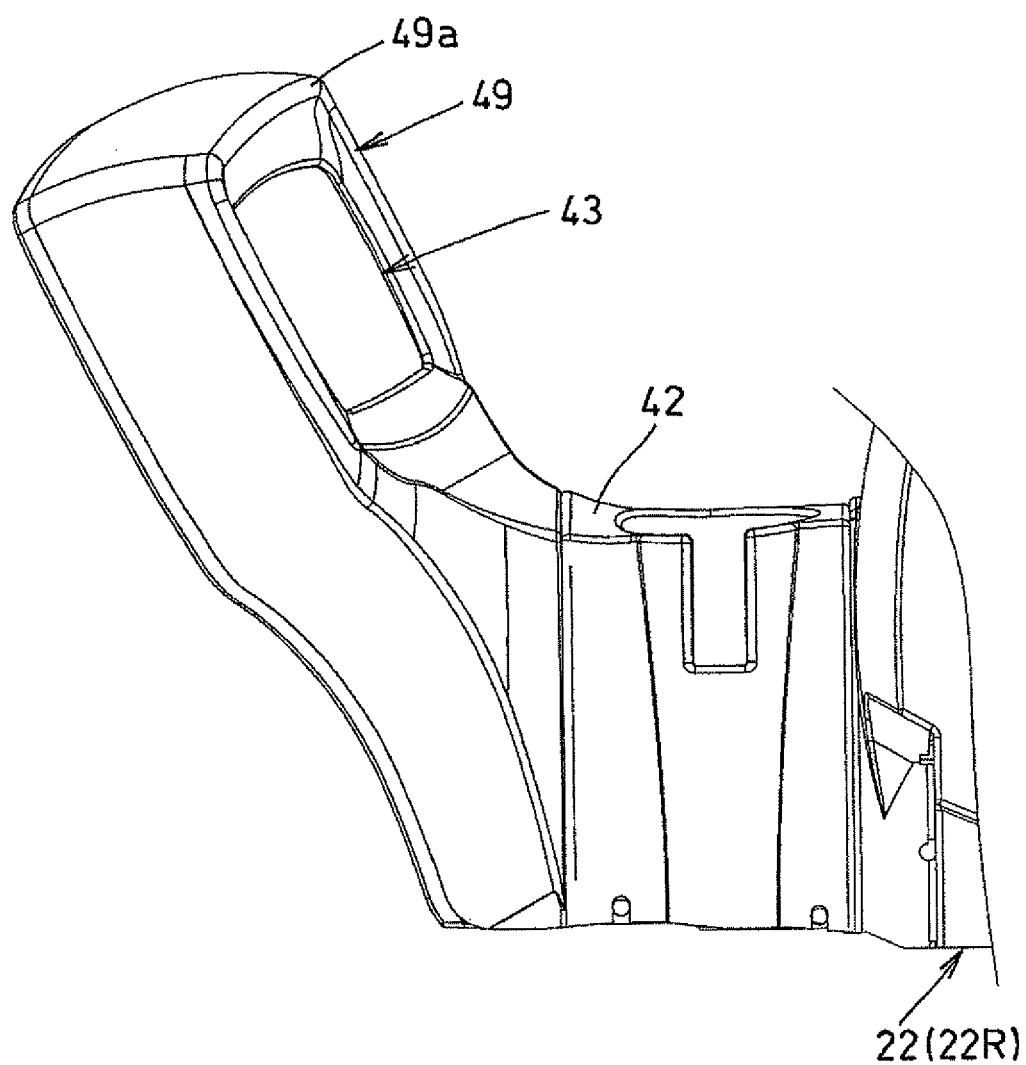
FIG. 3 is a side view of the display panel portion.
Figure 4:
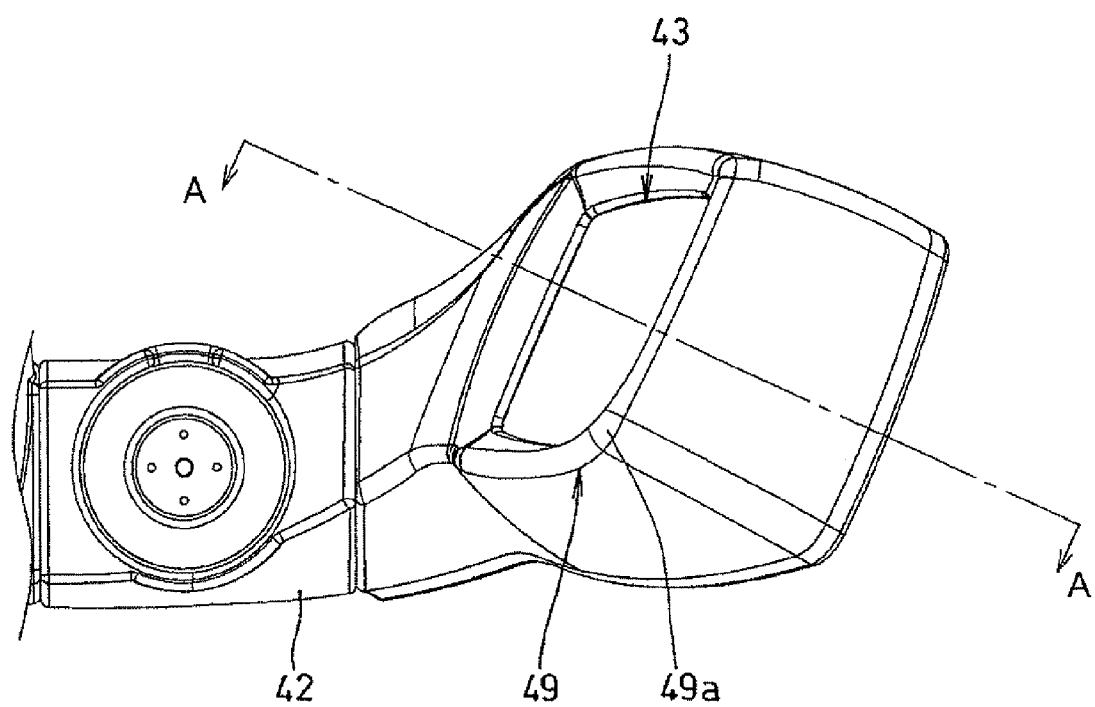
FIG. 4 is a plan view of the display panel portion.
Figure 5:
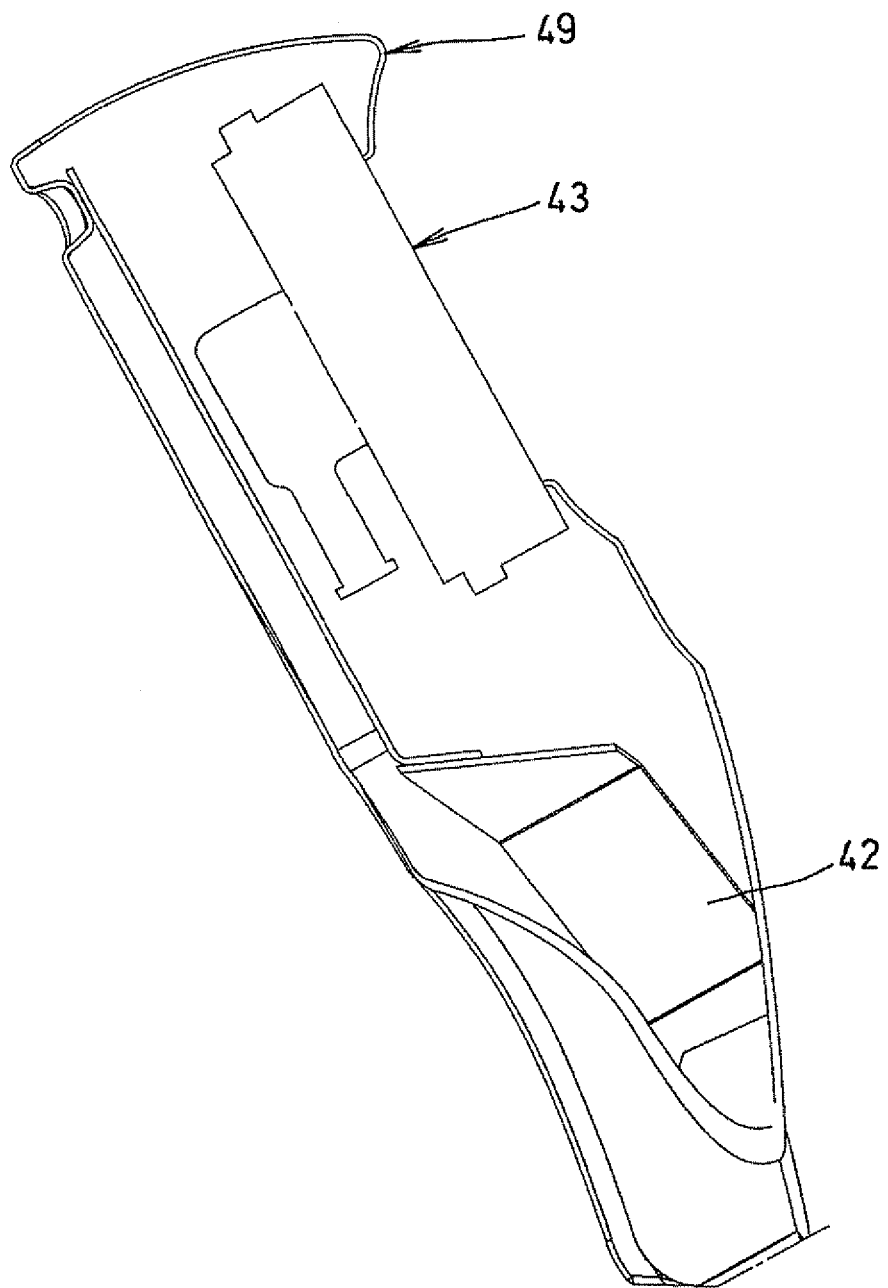
FIG. 5 is a cross-sectional view along line A-A in FIG. 4.

An eave 49 is formed so as to encircle the display panel 43, as shown in FIGS. 3 through 5. The eave 49 has an elevated front side end 49a on the side horizontally farther from the driver seat 9, and the eave 49 is inclined so that portion of the eave 49 horizontally approaching the driver seat 9 from the front side end gradually lowers, and also so that the portion of the eave 49 behind the front side end gradually lowers. In other words, in the present embodiment, since the display panel 43 is provided in front and to the right of the driver seat 9, the eave 49 is inclined so that the right front end (the front side end 49a on the side farther from the driver seat 9) is elevated, that the eave 49 gradually descends leftward from the right front portion, and that the eave 49 also gradually descends rearward from the right front portion.

The liquid crystal display unit 45 is configured so that black colors are displayed on a white background. The printed display unit 46 is formed with a white background similar to the background color of the liquid crystal display unit 45, and fixed displays 11, 12 are created from printing in black or another color. Therefore, the printed display unit 46 is formed with a background color similar to that of the liquid crystal display unit 45, the printed display unit 46 appears as a single continuous display with the liquid crystal display unit 45, and the liquid crystal display unit 45 appears to be enlarged by an amount equal to the surface area of the printed display unit 46. The printed display unit 46 is disposed so as to encircle the external periphery of the liquid crystal display unit 45, and the liquid crystal display unit 45 appears to be larger along the entire periphery.

The display panel 43 is disposed so that the display panel 43 is substantially perpendicular to the line of sight of an operator when the operator sitting in the driver seat 9 is looking forward at a downward incline, and the eave 49 is disposed so that the elevated front end portion of the eave 49 (the right end portion of the eave 49 in the present embodiment) is position higher than the rest of the eave 49.

Figure 9:
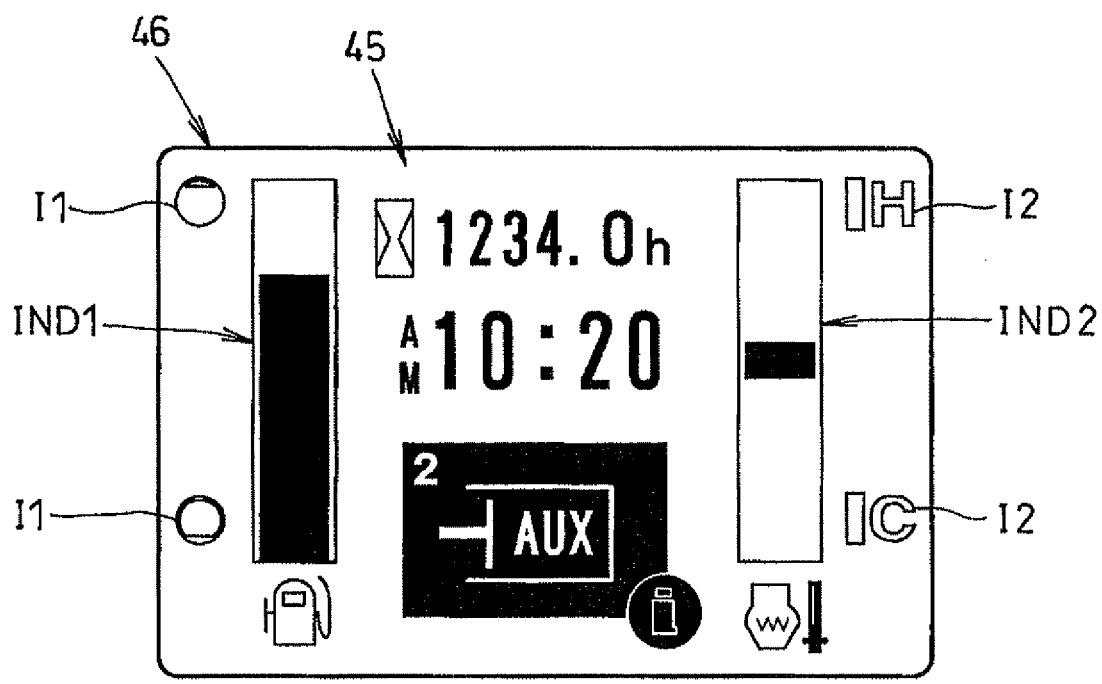
FIG. 9 is a plan view of the liquid crystal display and the printed display during a specific control mode.

The fixed display II of the printed display unit 46 is disposed to the immediate left of the liquid crystal display unit 45, and while the liquid crystal display unit 45 is in a display state during a specific control mode of the controller 39, a display IND1 at the left end of the liquid crystal display unit 45 is displayed as an indication of the fuel level in the fuel tank as shown in FIG. 9. The fixed display I2 of the printed display unit 46 is disposed to the immediate right of the liquid crystal display unit 45, and while the liquid crystal display unit 45 is in the display state during a specific control mode of the controller 39, a display IND2 on the right end of the liquid crystal display unit 45 is displayed as an indication of water temperature, as shown in FIG. 9.

Figure 18:
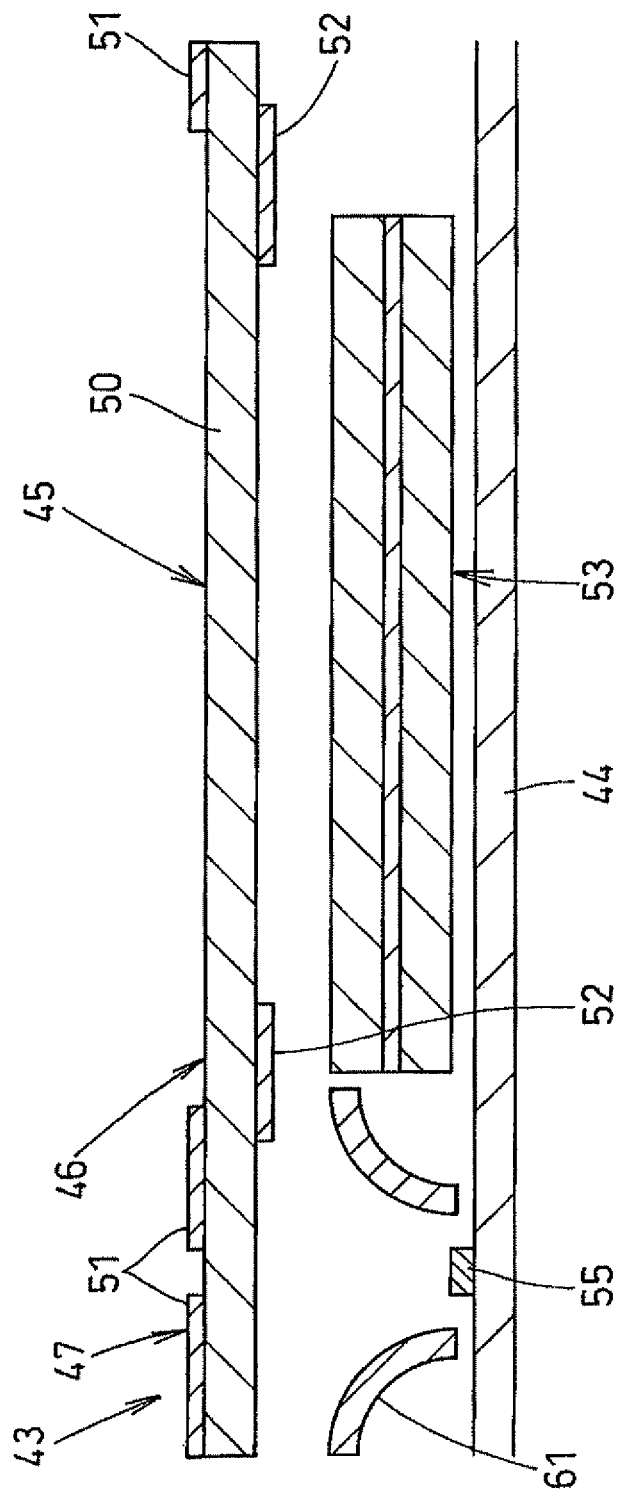
FIG. 18 is a cross-sectional view along line B-B in FIG. 8.

A transparent plate 50 is provided over a substrate 44 of the display panel 43, covering the light-blocking printed unit 47, the printed display unit 46, and the liquid crystal display unit 45, as shown in FIG. 18. Black light-blocking printed element 51 is placed in the external periphery of the front surface of the transparent plate 50 so as to form the light-blocking printed unit 47; white background printed element 52 for forming the background color of the printed display unit 46 is placed in the back surface of the transparent plate 50 closer to the center than the light-blocking printed element 51; and the fixed displays I1, I2, which are black or another color, are placed in the white background printed element 52. A liquid crystal panel (LCD) 53 for forming the liquid crystal display unit 45 is disposed inside (below) the center of the transparent plate 50.

A plurality of fixed displays IN1, IN2, IN3, IN4 is provided in a row running front to back in the light-blocking printed unit 47 on the left end of the display panel 43, as shown in FIG. 8. These fixed displays IN1, IN2, IN3, IN4 are formed having colored printing in red, yellow, or another color in the light blocking printed unit 47. For example, the fixed display IN1 is a display for producing a warning, the fixed display IN2 is a display for indicating that there is not enough engine oil, the fixed display IN3 is a display for indicating that the battery is not generating power, and the fixed display IN4 is a display for indicating that the vehicle is traveling at a high speed.

LEDs or other display lights 55 corresponding to each of the fixed displays IN1, IN2, IN3, IN4 are provided inside (below) the fixed displays IN1, IN2, IN3, IN4; and reflectors 61 are provided between the display lights 55 and the transparent plate 50, as shown in FIG. 18. The lighting of the display lights 55 indicates situations such as an insufficient amount of engine oil.

In the configuration shown in FIG. 18, the light-blocking printed element 51 and the fixed displays IN1, IN2, IN3, IN4 are placed on the front surface of the transparent plate 50; and the white background printed element 52 and the fixed displays I1, I2 are placed on the back surface of the transparent plate 50, but other options include placing the light-blocking printed element 51, the fixed displays IN1, IN2, IN3, IN4, the white background printed element 52, and the fixed displays I1, I2 on the back surface of the transparent plate 50; or placing the light-blocking printed element 51, the fixed displays IN1, IN2, IN3, IN4, the white background printed element 52, and the fixed displays I1, I2 on the front surface of the transparent plate 50.

A plurality of button switches SW (SW1, SW2, SW3, SW4, SW5) is installed in the control panel 48 behind the liquid crystal display unit 45, as shown in FIG. 8. The plurality of button switches SW is aligned left to right adjacent to the liquid crystal display unit 45. Fixed displays N (N1, N2, N3, N4, N5) for indicating the purpose of the button switches SW are placed in a covering 62 for covering the tops of the plurality of button switches SW. The button switches SW are used to perform the following operations under normal circumstances.

Specifically, the button switch SW1 is used to specify user settings whereby a user who is using the work vehicle 1 can set the operation, function, or the like of the attachment A as indicated by the fixed display N1; the button switch SW2 is used for crane applications to set the work mode to a hoisting work mode as indicated by the fixed display N2; the button switch SW3 is used to specify an arm limit for setting a limit on the swinging range of the arm 17 of the attachment apparatus 13 as indicated by the fixed display N3; the button switch SW4 is used to indicate information for giving specific instructions or the like to the user through the liquid crystal display unit 45 as indicated by the fixed display N4; and the button switch SW5 is a display switcher for switching the display of the liquid crystal display unit 45 as indicated by the fixed display N5. The button switches SW are connected to the controller 39 as shown in FIG. 7, and operation signals of the button switches SW are inputted to the controller 39. The liquid crystal display unit 45 is also configured so as to be controlled by the controller 39 and to provide a variable display.

The designations or functions of the button switches SW can be varied according to the control mode of the controller 39, and switch function displays (function marks) F for indicating the designations or functions of the button switches SW are variably displayed according to the button switches SW on back end of the liquid crystal display unit 45, which is the end closer to the button switches SW.

Specifically, when the controller 39 is in SP flow rate limit setting mode or attachment A control mode, for example, the display on the liquid crystal display unit 45 has four switch function displays F (F2, F3, F4, F5) displayed to indicate the designations or functions of the button switches SW in the back end of the liquid crystal display unit 45, as shown in FIGS. 10 through 17. The switch function displays F2 to F5 display the functions or other features of the button switches SW2 to SW5, and while the button switch SW1 remains a user setting switch, the button switch SW2 has a lowering function as indicated by the switch function display F2, the button switch SW3 has a raising function as indicated by the switch function display F3, the button switch SW4 has an advance function as indicated by the switch function display F4, and the button switch SW5 has an enter function as indicated by the switch function display F5.

The switch function displays F (F2 to F5) and the corresponding button switches SW (SW2 to SW5) are misaligned from each other in parallel directions (to the left and right), as shown in FIG. 8. This is because there are fewer switch function displays F displayed on the liquid crystal display unit 45 than there are button switches SW, and the button switches SW are aligned left to right within the left-to-right width of the control panel 48 immediately behind the liquid crystal display unit 45, and are shifted to the left and right in relation to the switch function displays F of the liquid crystal display unit 45 so as to fit in the maximum space. Therefore, dividing lines 57 are formed in the control panel 48 so as to clarify the corresponding relationships between the button switches SW and the switch function displays F.

The dividing lines 57 are provided between the button switches SW of the control panel 48; the dividing lines 57 have mutually parallel arcuate shapes and are disposed at an incline in relation to the liquid crystal display unit 45 so that their back ends more gradually to the right; and the dividing lines 57 are formed so that the button switches SW are disposed between adjacent dividing lines 57 and that the switch function displays F corresponding to the button switches SW are positioned above and between the ends of the adjacent dividing lines 57 on the side proximal to the liquid crystal display unit 45.

A plurality of indicators ID (ID1, ID2, ID3, ID4, ID5) corresponding to the button switches SW is respectively provided on the control panel 48. When lit, the indicators ID indicate that the corresponding button switches SW are on, and the indicators ID are disposed between the adjacent dividing lines 57 where the corresponding respective button switches SW are disposed.

Dividing lines 58 are provided between the adjacent switch function displays F on the liquid crystal display unit 45, and the dividing lines 58 are formed so as to be continuous with the corresponding dividing lines 57 of the control panel 48.

Figure 10:
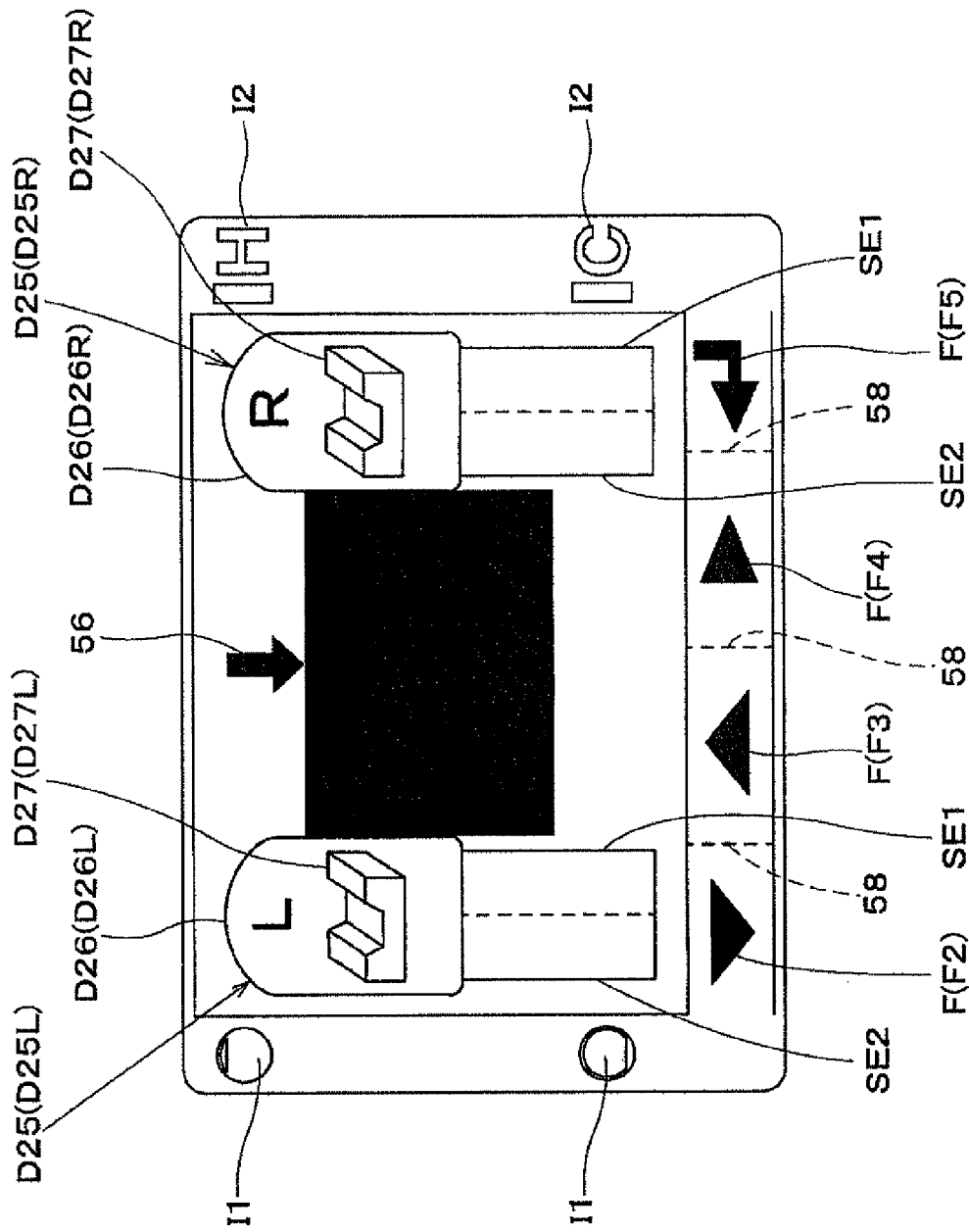
FIG. 10 is a plan view of the liquid crystal display unit and printed display unit for a case such as one in which an attachment is operated.
Figure 11:
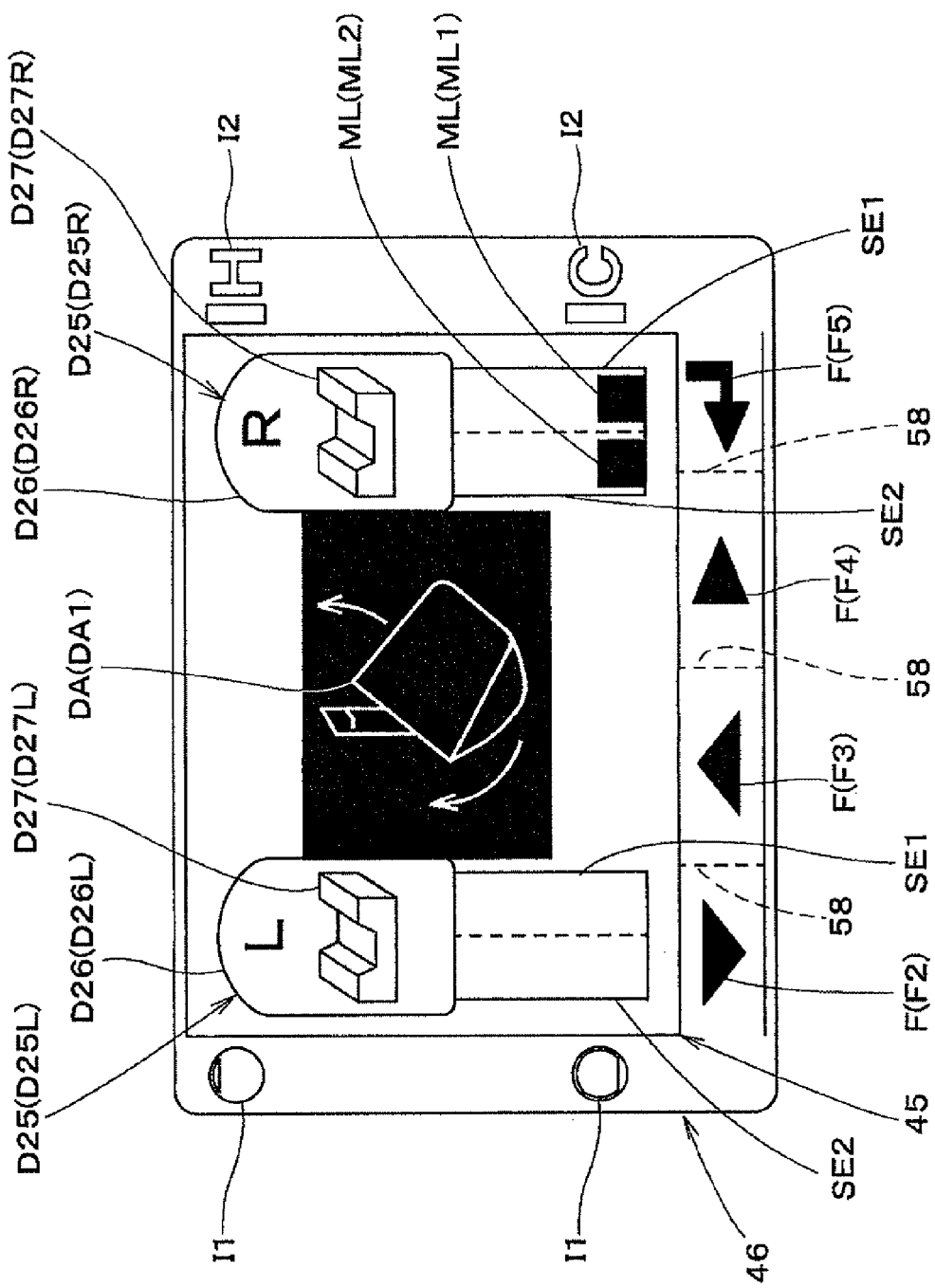
FIG. 11 is a plan view of the liquid crystal display unit and printed display unit for a case such as one in which an attachment is operated.
Figure 12:
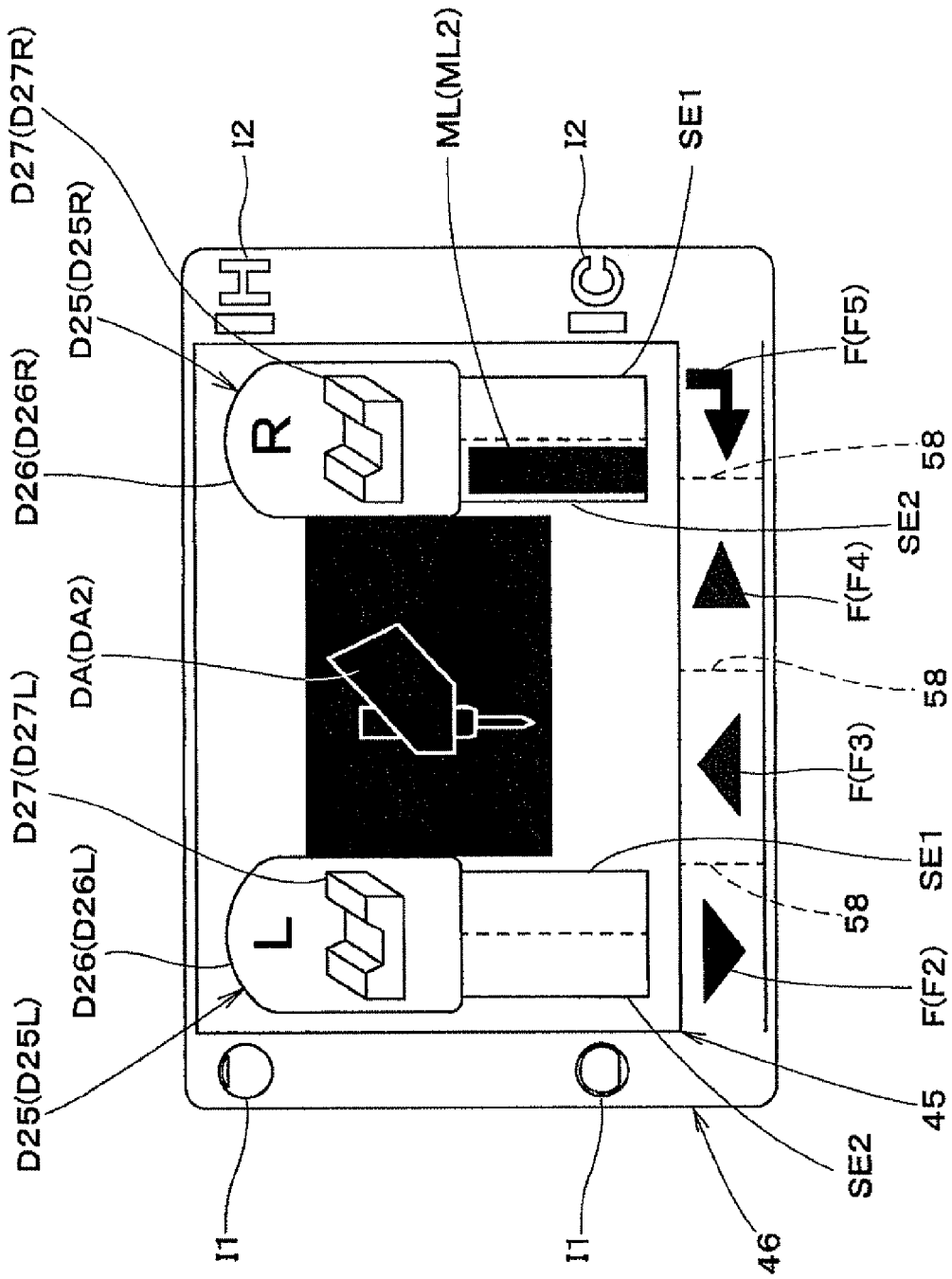
FIG. 12 is a plan view of the liquid crystal display unit and printed display unit for a case such as one in which an attachment is operated.
Figure 13:
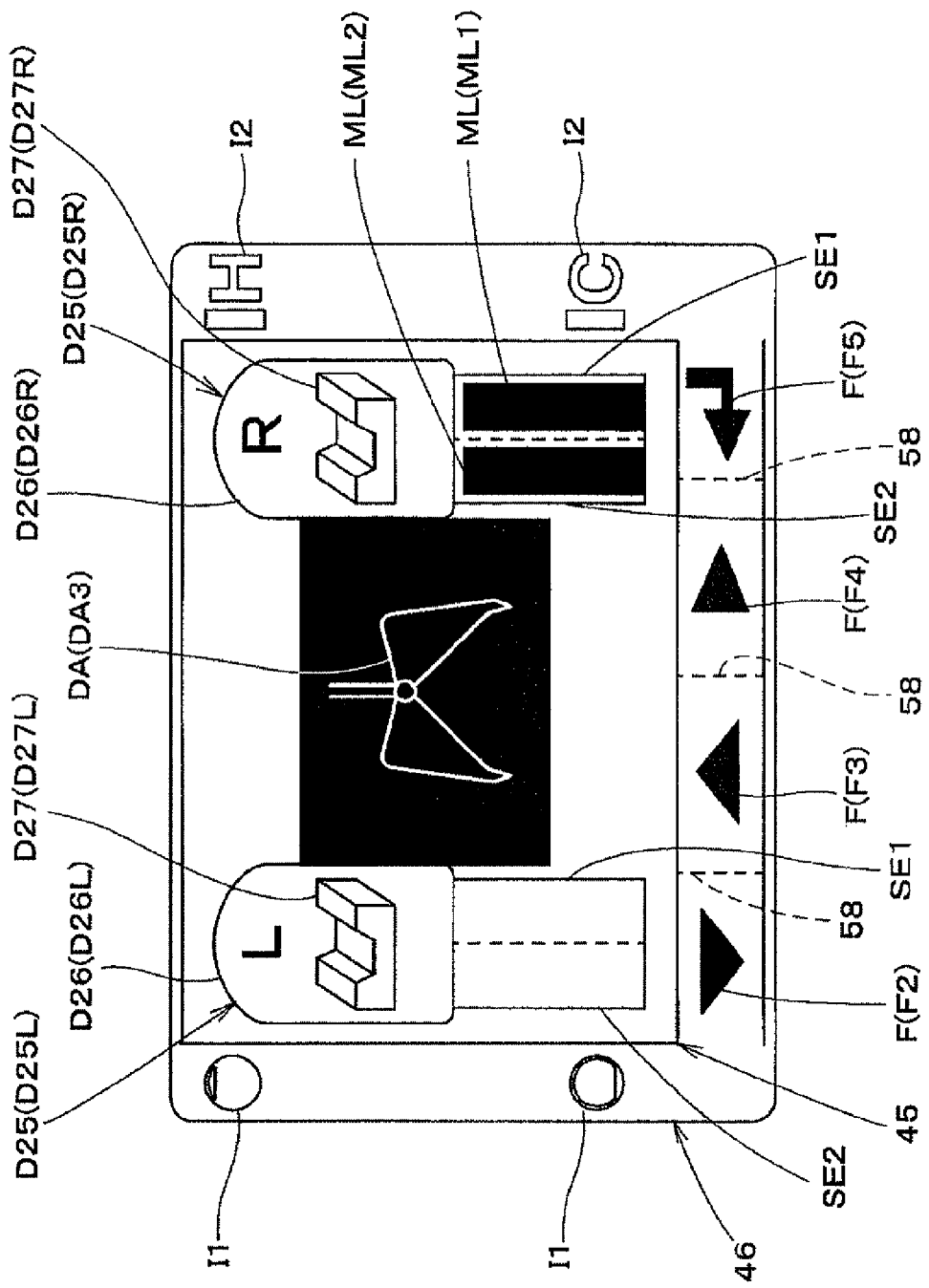
FIG. 13 is a plan view of the liquid crystal display unit and printed display unit for a case such as one in which an attachment is operated.
Figure 14:
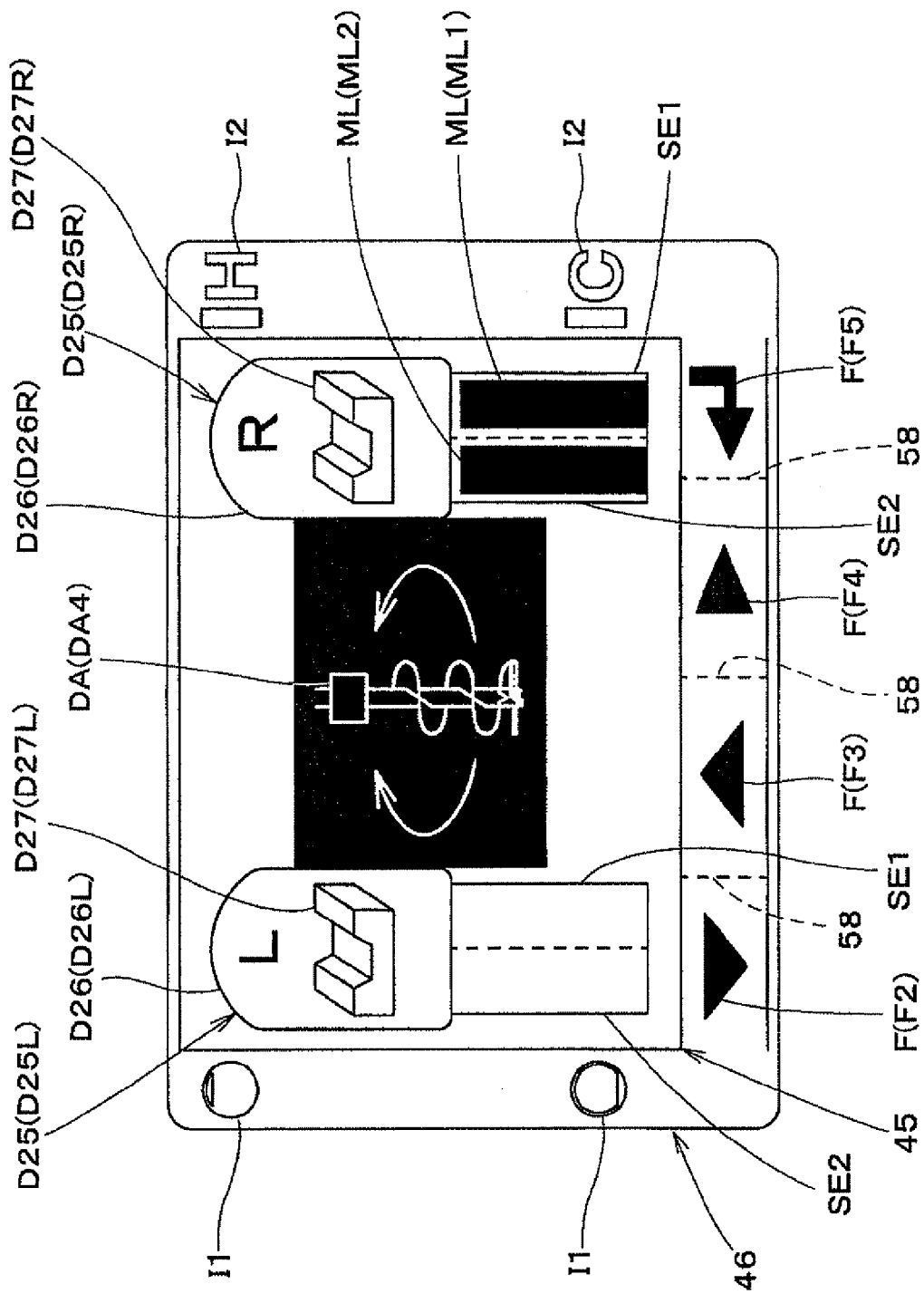
FIG. 14 is a plan view of the liquid crystal display unit and printed display unit for a case such as one in which an attachment is operated.
Figure 15:
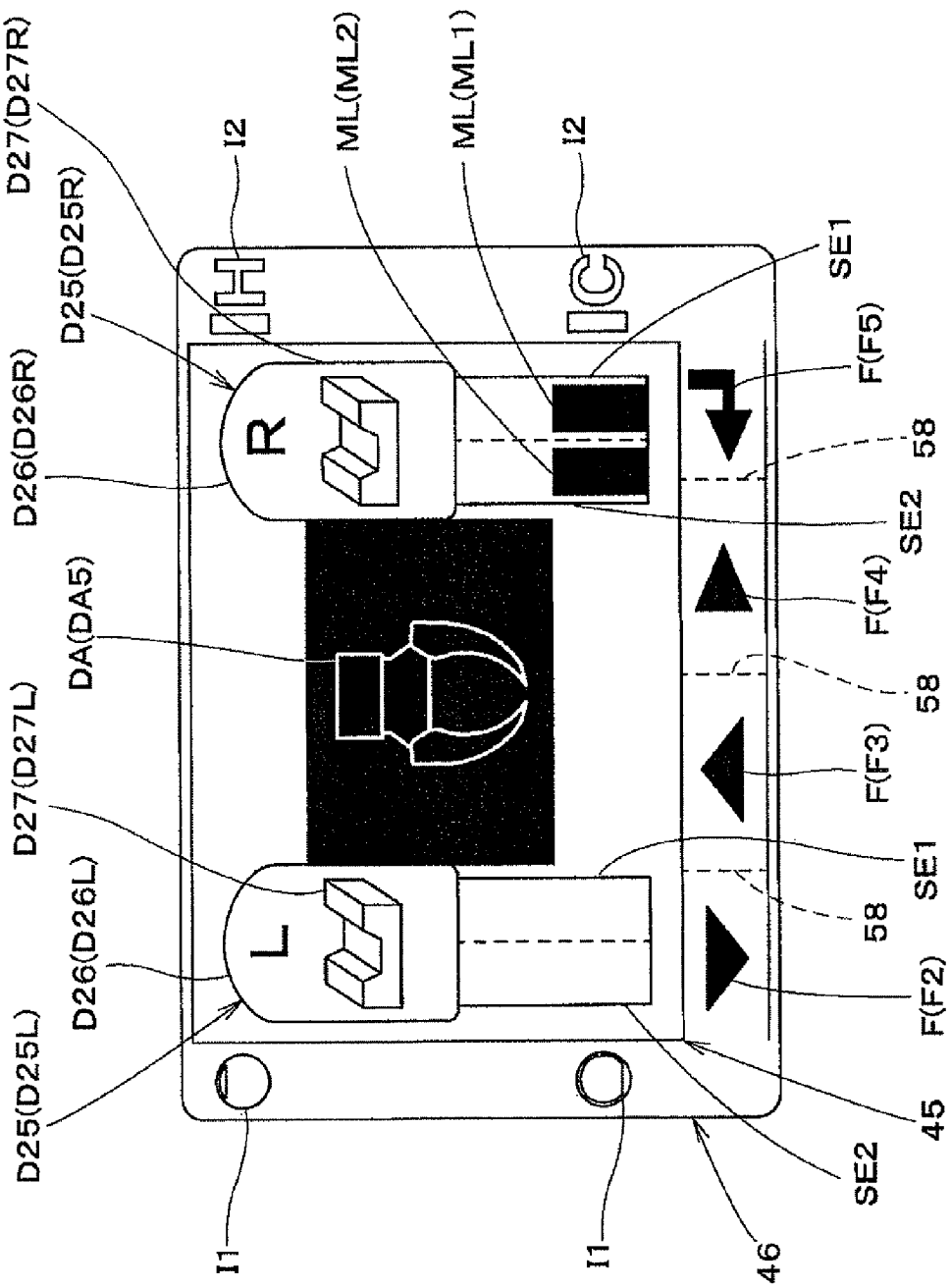
FIG. 15 is a plan view of the liquid crystal display unit and printed display unit for a case such as one in which an attachment is operated.
Figure 16:
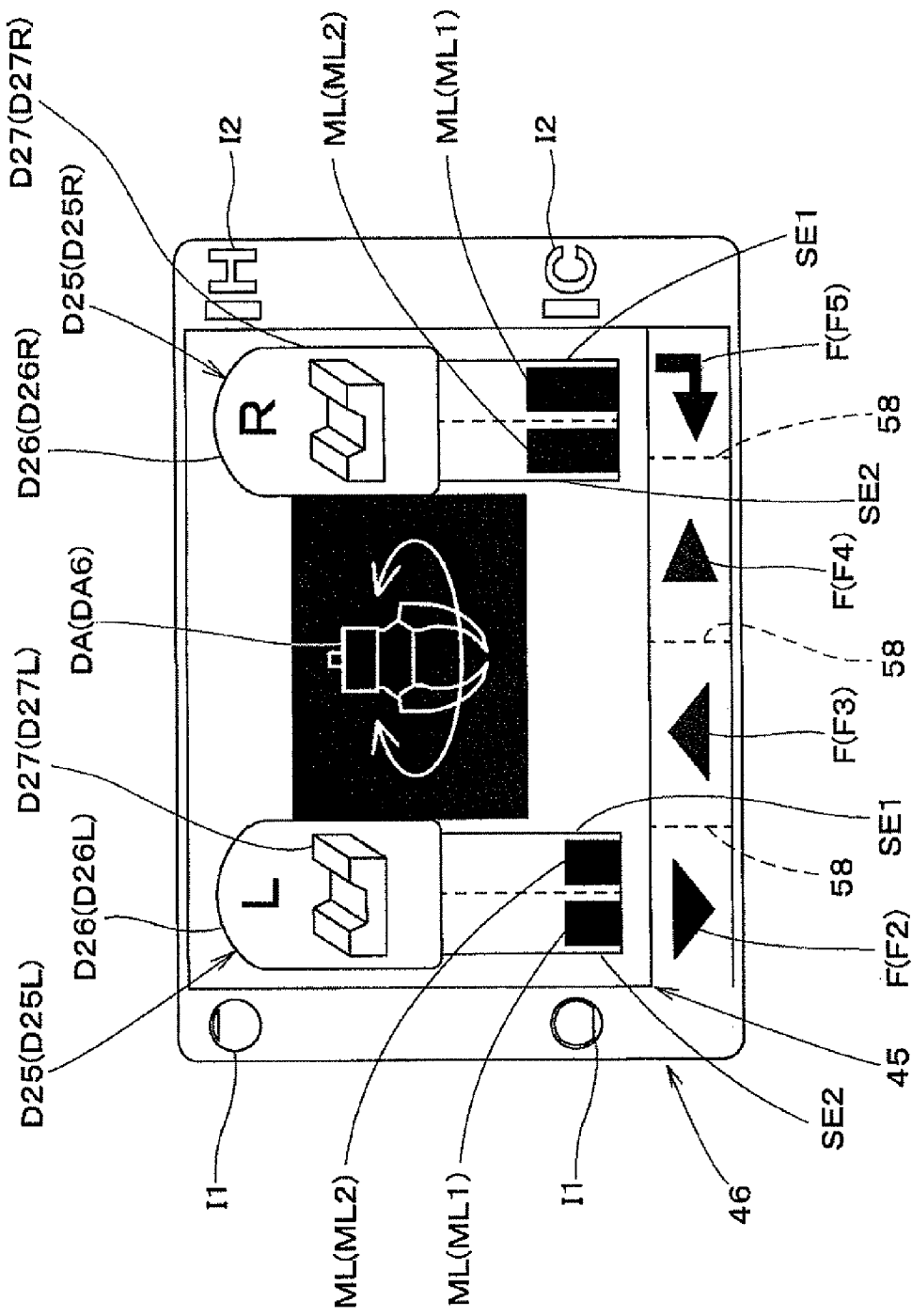
FIG. 16 is a plan view of the liquid crystal display unit and printed display unit for a case such as one in which an attachment is operated.
Figure 17:
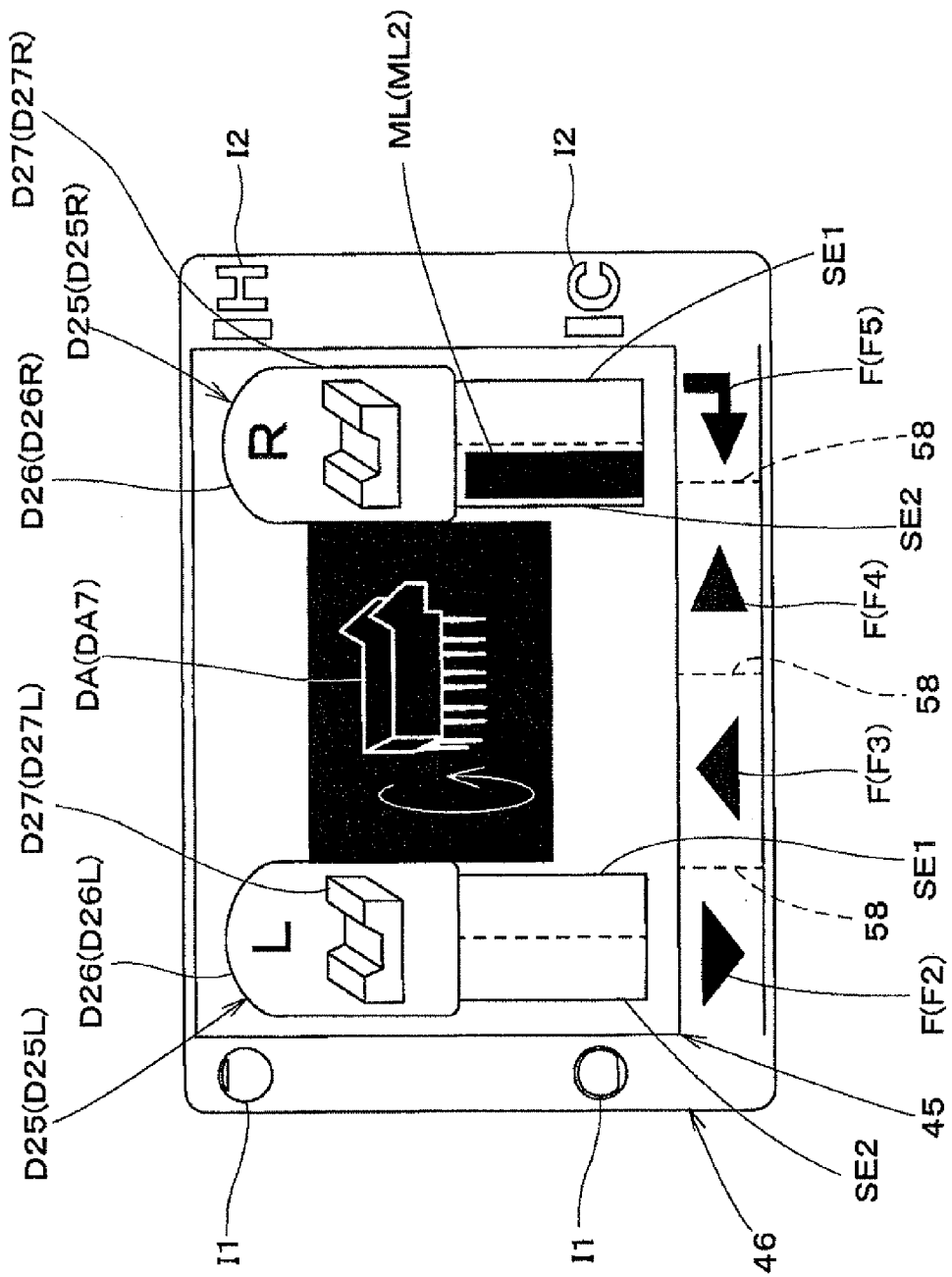
FIG. 17 is a plan view of the liquid crystal display unit and printed display unit for a case such as one in which an attachment is operated.

A plurality of operating member symbols D25 and attachment symbols DA is displayed on the liquid crystal display unit 45 as screens for the SP flow rate limit setting or for the attachment A operation, as shown in FIGS. 10 through 17. The operating member symbols D25 include a left operating member symbol D25L corresponding to the left operating member 25L and a right operating member symbol D25R corresponding to the right operating member 25R; and the attachment symbols DA include an attachment symbol DA1 corresponding to the tilt bucket A1, an attachment symbol DA2 corresponding to the breaker A2, an attachment symbol DA3 corresponding to the clamshell A5, an attachment symbol DA4 corresponding to the auger A4, an attachment symbol DA5 corresponding to the grapple A5, an attachment symbol DA6 corresponding to the rotary grapple A6, and an attachment symbol DA7 corresponding to the brush cutter A7. FIG. 10 shows a memory M, described hereinafter, as being blank.

Specifically, in FIGS. 11 through 17, the two operating member symbols D25L, D25R that show the left and right operating members 25L, 25R are both displayed on the liquid crystal display unit 45. These two operating member symbols D25L, D25R are displayed separately on the left and right of the liquid crystal display unit 45 in accordance with the disposed positions of the left and right operating members 25L, 25R.

The operating member symbols D25 include a pair of left and right operating lever symbols D26 corresponding to the left and right operating levers 26, and a pair of left and right switch symbols D27 corresponding to the pair of left and right volume switches 27. The operating lever symbols D26 include a left operating lever symbol D26L corresponding to the left operating lever 26L and a right operating lever symbol D26R corresponding to the right operating lever 26R, and the switch symbols D27 include a left switch symbol D27 corresponding to the left volume switch 27L and a right switch symbol D27R corresponding to the right volume switch 27R.

An attachment symbol DA indicating the attachment A mounted on the work vehicle 1 is variably displayed between the two operating member symbols D25 on the liquid crystal display unit 45.

Aligned within the operating member symbols D25 in the liquid crystal display unit 45 are a first flow rate display section SE1 for displaying the maximum flow rate levels ML that display the flow rate levels at which hydraulic oil is supplied and drained in one direction to and from the actuators 31, 32, and a second flow rate display section SE2 for displaying the maximum flow rate levels ML at which hydraulic oil is supplied and drained in the other direction to and from the actuators 31, 32. The first flow rate display section SE1 and second flow rate display section SE2 are aligned left to right within the respective operating member symbols D25, and are configured so that the first flow rate display section SE1 displays the first maximum flow rate level ML1 of hydraulic oil supplied and drained in one direction to and from the actuators 31, 32 by the operation of the corresponding operating members 25, while the second flow rate display section SE2 displays the second maximum flow rate level ML2 of hydraulic oil supplied and drained in the other direction to and from the actuators 31, 32 by the operation of the corresponding operating members 25.

As described above, the maximum flow rate levels ML of hydraulic oil supplied to and drained from the actuators 31, 32 of the attachment A mounted on the work vehicle 1 is displayed on the liquid crystal display unit 45 in accordance with the operating member symbols D25, which correspond to the operating members 25. The display is performed according to the operation of the operating members 25 (volume switches 27).

In the below-described control mode for setting the SP flow rate limit or the like, a cursor 56 is displayed on the liquid crystal display unit 45 as shown in FIG. 10, and the cursor 56 moves left and right to indicate the first flow rate display section SE1, the second flow rate display section SE2, or the attachment symbols DA.

The controller 39 is provided with a storage unit 59 as shown in FIG. 7, and the storage unit 59 has a plurality of memory units M (M1, M2, M3, M4, M5, M6, M7, M8, M9). The first maximum flow rate level ML1 of the hydraulic oil supplied and drained in one direction to and from the actuators 31, 32 of the attachment A, and the second maximum flow rate level ML2 of the hydraulic oil supplied and drained in the other direction to and from the actuators 31, 32 of the attachment A, are stored in the memory units M in accordance with the attachments A mounted on the work vehicle 1. The first maximum flow rate level ML1 and second maximum flow rate level ML2 corresponding to the attachments A are retrieved from the storage memory units M by operating or otherwise manipulating the button switches SW. The first maximum flow rate level ML1 and second maximum flow rate level ML2 are displayed on the liquid crystal display unit 45 in accordance with the operating member symbols D25, and the hydraulic oil can be supplied and drained to and from the actuators 31, 32 by operating the operating members 25 on the basis of the displayed first maximum flow rate level ML1 and second maximum flow rate level ML2.

Figure 21:
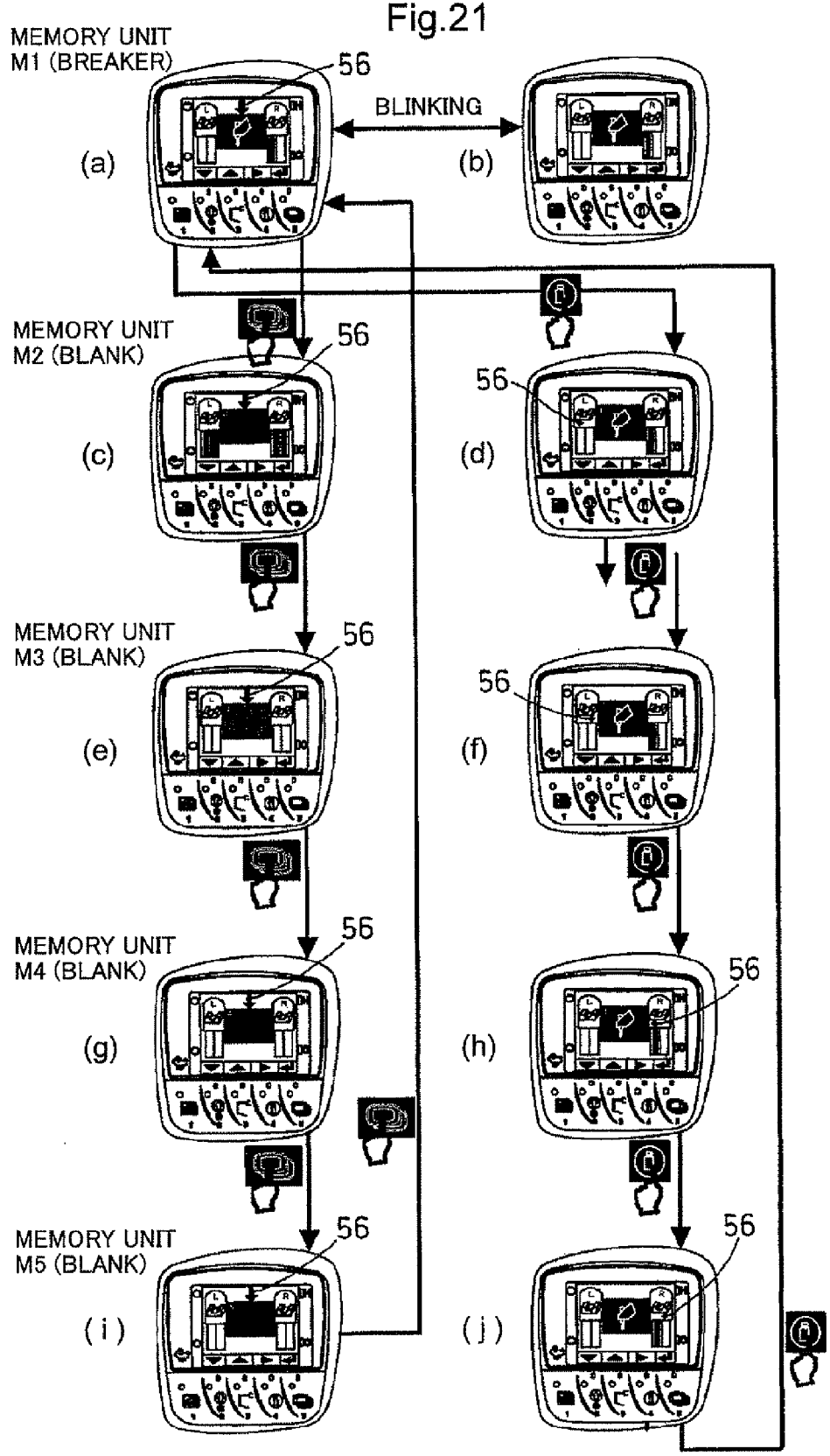
FIG. 21 is a flowchart of the display unit.

The following is a description, made with reference to the flowchart of the liquid crystal display unit 45 shown in FIG. 21, of the procedure by which the flow rate limit setting means 41 of the controller 39 sets the flow rate limit of hydraulic oil for the actuators 31, 32 of the attachment A mounted on the work vehicle 1.

When the controller 39 is set to the SP flow rate limit setting mode and the memory unit M1 of the storage unit 59 is selected by operating or otherwise manipulating the button switches SW, the contents stored in the memory unit M1 are brought up, and the operating member symbols D25, attachment symbols DA, or other contents stored in the memory unit M1 are displayed on the liquid crystal display unit 45 as shown in FIG. 21(*a*). In the display in FIG. 21(*a*), the attachment symbol DA2 corresponding to the breaker A2 is displayed, and the cursor 56 points to the attachment symbol DA2.

When the button switch SW4 is pressed from the state shown in FIG. 21(*a*), the cursor 56 moves and points to the second flow rate display section SE2 in the operating member symbol D25L, as shown in FIG. 21(*d*). When the button switch SW3 is pressed in the state shown in FIG. 21(*d*), the second maximum flow rate level ML2 of the second flow rate display section SE2 in the operating member symbol D25L gradually rises, and the second maximum flow rate level ML2 of hydraulic oil supplied and drained in the other direction to and from the actuator 31 by the operation of the operating member 25L is variably set by the flow rate limit setting means 41 of the controller 39 so as to gradually increase in a corresponding manner. When the button switch SW2 is pressed in the state shown in FIG. 21(*d*), the second maximum flow rate level ML2 of the second flow rate display section SE2 in the operating member symbol D25L gradually falls, and the second maximum flow rate level ML2 of hydraulic oil supplied and drained in the other direction to and from the actuator 31 by the operation of the operating member 25L is variably set by the flow rate limit setting means 41 of the controller 39 so as to gradually decrease in a corresponding manner.

When the button switch SW4 is pressed in the state shown in FIG. 21(*d*), the cursor 56 moves to the right and points to the first flow rate display section SE1 in the operating member symbol D25L, as shown in FIG. 21(*f*). When the button switch SW3 is pressed in the state shown in FIG. 21(*f*), the first maximum flow rate level ML1 of the first flow rate display section SE1 in the operating member symbol D25L gradually rises, and the first maximum flow rate level ML1 of hydraulic oil supplied and drained in the one direction to and from the actuator 32 by the operation of the operating member 25L is variably set by the flow rate limit setting means 41 of the controller 39 so as to gradually increase in a corresponding manner. When the button switch SW2 is pressed in the state shown in FIG. 21(*f*), the first maximum flow rate level ML1 of the first flow rate display section SE1 in the operating member symbol D25L gradually falls, and the first flow rate level ML1 of hydraulic oil supplied and drained in the one direction to and from the actuator 32 by the operation of the operating member 25L is variably set by the flow rate limit setting means 41 of the controller 39 so as to gradually decrease in a corresponding manner.

When the button switch SW4 is pressed in the state shown in FIG. 21(*f*), the cursor 56 moves to the right as shown in FIG. 21(*h*), and the cursor 56 points to the second flow rate display section SE2 in the operating member symbol D25R. When the button switch SW3 is pressed in the state shown in FIG. 21(*h*), the second maximum flow rate level ML2 of the second flow rate display section SE2 in the operating member symbol D25R gradually rises, and the second maximum flow rate level ML2 of hydraulic oil supplied and drained in the other direction to and from the actuator 31 by the operation of the operating member 25R is variably set by the flow rate limit setting means 41 of the controller 39 so as to gradually increase in a corresponding manner. When the button switch SW2 is pressed in the state shown in FIG. 21(*h*), the second maximum flow rate level ML2 of the second flow rate display section SE2 in the operating member symbol D25R gradually falls, and the second maximum flow rate level ML2 of hydraulic oil supplied and drained in the other direction to and from the actuator 31 by the operation of the operating member 25R is variably set by the flow rate limit setting means 41 of the controller 39 so as to gradually decrease in a corresponding manner.

When the button switch SW4 is pressed in the state shown in FIG. 21(*h*), the cursor 56 moves to the right as shown in FIG. 21(*j*), and the cursor 56 points to the first flow rate display section SE1 in the operating member symbol D25R. When the button switch SW3 is pressed in the state shown in FIG. 21(*j*), the first maximum flow rate level ML1 of the first flow rate display section SE1 in the operating member symbol D25R gradually rises, and the first maximum flow rate level ML1 of hydraulic oil supplied and drained in the one direction to and from the actuator 31 by the operation of the operating member 25R is variably set by the flow rate limit setting means 41 of the controller 39 so as to gradually increase in a corresponding manner. When the button switch SW2 is pressed in the state shown in FIG. 21(*j*), the first maximum flow rate level ML1 of the first flow rate display section SE1 in the operating member symbol D25R gradually falls, and the first maximum flow rate level ML1 of hydraulic oil supplied and drained in the one direction to and from the actuator 31 by the operation of the operating member 25R is variably set by the flow rate limit setting means 41 of the controller 39 so as to gradually decrease in a corresponding manner.

When the button switch SW4 is pressed in the state shown in FIG. 21(*j*), the cursor 56 moves and points to the attachment symbol DA, as shown in FIG. 21(*a*), and the cursor 56 then points to the attachment symbol DA as shown in FIGS. 21(*a*) and (*b*). When the button switch SW2 is pressed in this state, the display of the attachment symbol DA switches sequentially from being blank to the tilt bucket A1, the breaker A2, the clamshell A3, the auger A4, the grapple A5, the rotary grapple A6, and then the brush cutter A7 with each press of the button switch SW2, as shown by the solid line arrow in FIG. 22, whereby the type of attachment A for setting the flow rate limit of hydraulic oil can be switched. When the button switch SW3 is pressed in the state shown in FIG. 21(*a*) or 21(*b*), the display of the attachment symbol DA switches sequentially from the brush cutter A7 to the rotary grapple A6, the grapple A5, the auger A4, the clamshell A3, the breaker A2, the tilt bucket A1, and then to being blank with each press of the button switch SW2, as shown by the dashed line arrow in FIG. 22, whereby the type of attachment A for setting the flow rate limit of hydraulic oil can be switched.

When the button switch SW5 is pressed in the state shown in FIG. 21(*a*), the type of attachment A whose flow rate limit is to be set in the memory unit M1 of the controller 39, as well as the corresponding maximum flow rate levels ML of hydraulic oil supplied to and drained from the actuators 31, 32, are set to the specific options displayed in FIG. 21(*a*), and are stored in the memory unit M1. Additionally, the memory unit M2 of the storage unit 59 is brought up and the stored contents thereof are displayed on the liquid crystal display unit 45 as shown in FIG. 21(*c*). A state is reached in which the type of attachment A whose flow rate limit is to be set in the memory unit M2 of the controller 39, the corresponding maximum flow rate levels ML of hydraulic oil supplied to and drained from the actuators 31, 32, and other parameters can be set in the same manner as in the state shown in FIG. 21(*a*).

Similarly, every time the button switch SW5 is hereinafter pressed, the type of attachment A whose flow rate limit is to be set in the memory units M2, M3, M4, M5 of the controller 39, as well as the corresponding maximum flow rate levels ML of hydraulic oil supplied to and drained from the actuators 31, 32, are set from the state shown in FIGS. 21(*c*), (*e*), (*g*), and (*i*) and are stored sequentially in the memory units M2, M3, M4, M5. Additionally, the memory units M3, M4, M5 of the storage unit 59 are brought up and displayed on the liquid crystal display unit 45 as shown in FIGS. 21(*e*), (*g*), and (*i*), and the state is repeated in which settings can be made for the type of attachment A whose flow rate limit is to be set in the memory units M3, M4, M5 of the controller 39, and for the corresponding maximum flow rate levels ML of hydraulic oil supplied to and drained from the actuators 31, 32.

As described above, the respective settings of the maximum flow rate levels ML of hydraulic oil supplied to and drained from the actuators 31, 32 of the attachment A are stored in accordance with each type of attachment A (blank, tilt bucket A1, breaker A2, clamshell A3, auger A4, grapple A5, rotary grapple A6, brush cutter A7) in the memory units M of the storage unit 59 of the controller 39, as shown in FIGS. 10 through 15 and FIG. 19, for example. The contents displayed on the liquid crystal display unit 45, as well as the contents of the flow rate limit settings stored in the memory units M of the storage unit 59 of the controller 39, are then brought up in a simple manner by pressing the button switches SW, and the maximum flow rate levels ML supplied to and drained from the actuators 31, 32 of the attachment A mounted on the work vehicle 1 is displayed on the liquid crystal display unit 45 in accordance with the operating member symbols D25 that correspond to the operating members 25. Therefore, the maximum flow rate levels ML for the actuators 31, 32 of the attachment A as set by the operation of the operating members 25 (volume switches 27) can be confirmed in a simple and clear manner by viewing the liquid crystal display unit 45, and the attachment A can therefore be operated in a simple manner via the operating members 25.

According to the embodiment described above, operating member symbols D25 that show the operating members 25 are displayed on the liquid crystal display unit 45, and the maximum flow rate levels ML of hydraulic oil supplied to and drained from the actuators 31, 32 by the operation of the operating members 25 are displayed in accordance with the operating member symbols D25. Therefore, it can easily and clearly be seen which maximum flow rate level ML of hydraulic oil set by the flow rate limit setting means 41 corresponds to which operating member 25 by viewing the display of the liquid crystal display unit 45, and the attachment A can be operated smoothly via the operating members 25.

Moreover, first flow rate display section SE1 for displaying the flow rate levels at which hydraulic oil is supplied and drained in one direction to and from the actuators 31, 32, as well as second flow rate display section SE2 for displaying flow rate levels at which hydraulic oil is supplied and drained in the other direction to and from the attachment A, are aligned in accordance with the operating member symbols D25 within the operating member symbols D25 of the liquid crystal display unit 45; and first maximum flow rate levels ML1 of hydraulic oil supplied and drained in one direction to and from the actuators 31, 32 by the operation of the operating members 25 are displayed in the first flow rate display section SE1, while second maximum flow rate levels ML2 of hydraulic oil supplied and drained in the other direction to and from the actuators 31, 32 by the operation of the operating members 25 are displayed in the second flow rate display section SE2. Therefore, the first maximum flow rate levels ML1 and the second maximum flow rate levels ML2 can be displayed separately in a clear manner in accordance with the operating member symbols D25 that show the operating members 25. Even in cases in which the first maximum flow rate levels ML1 and the second maximum flow rate levels ML2 are variably set in an individual manner, it can easily and clearly be seen which of the first maximum flow rate levels ML1 of hydraulic oil and second maximum flow rate levels ML2 of hydraulic oil set by the flow rate limit setting means 41 correspond to which operation of which operating member 25 by viewing the display of the liquid crystal display unit 45, and the attachment A can be operated smoothly via the operating members 25.

A plurality of operating member symbols D25 that show a plurality of operating members 25 are each displayed on the liquid crystal display unit 45, and the maximum flow rate levels ML of hydraulic oil supplied to and drained from the actuators 31, 32 in accordance with the operation of the operating members 25 are displayed on the liquid crystal display unit 45 in accordance with the operating member symbols D25 that correspond to the operating members 25. Therefore, a plurality of operating members 25 is provided for operating the attachment A mounted on the work vehicle 1. Even in cases in which the maximum flow rate levels ML are variably set individually in accordance with the operating members 25 by the flow rate limit setting means 41, it can easily and clearly be seen which of the maximum flow rate levels ML of hydraulic oil set by the flow rate limit setting means 41 correspond to which operating member 25 by viewing the display of the liquid crystal display unit 45, and the attachment A can be operated smoothly via the operating members 25.

Since an attachment symbol DA that shows the attachment A mounted on the work vehicle 1 is displayed on the liquid crystal display unit 45, it can be clearly seen which attachment A is being actuated by the operation of the operating members 25 by viewing the display on the liquid crystal display unit 45, and the attachment A can be operated smoothly via the operating members 25 from this aspect as well.

The first maximum flow rate levels ML1 of hydraulic oil supplied and drained in one direction to and from the actuators 31, 32 of the attachment A, as well as the second maximum flow rate levels ML2 of hydraulic oil supplied and drained in the other direction to and from the actuators 31, 32 of the attachment A, are stored in the memory units M in accordance with the plurality of attachments A mounted on the work vehicle; the first maximum flow rate levels ML1 and second maximum flow rate levels ML2 corresponding to the attachments A mounted on the work vehicle 1 are retrieved from the memory units M; and the first maximum flow rate levels ML1 and second maximum flow rate levels ML2 are displayed in accordance with the operating member symbols D25 on the liquid crystal display unit 45. Therefore, the first maximum flow rate levels ML1 and second maximum flow rate levels ML2 set for each attachment A mounted on the work vehicle 1 can easily been seen according to each attachment A on the liquid crystal display unit 45, and operation suited to the attachment A mounted on the work vehicle 1 can be smoothly carried out via the operating members 25.

According to the embodiment described above, a plurality of switch function displays F and a plurality of corresponding button switches SW are misaligned from each other in parallel directions; dividing lines 57 are formed between the button switches SW; the button switches SW are placed between adjacent dividing lines 57; and the dividing lines 57 are formed so that the switch function displays F corresponding to the button switches SW are positioned above and between the ends of the adjacent dividing lines 57 on the side proximal to the liquid crystal display unit 45. Therefore, even though the switch function displays F of the liquid crystal display unit 45 and their corresponding button switches SW are misaligned from each other in parallel directions, the correspondence relationship between the switch function displays F of the liquid crystal display unit 45 and the button switches SW is clear, and the button switches SW can be operated smoothly without error.

A plurality of indicators ID corresponding to the plurality of button switches SW is also provided, and the indicators ID are disposed between adjacent dividing lines 57 where the corresponding button switches SW are also disposed. Therefore, the correspondence relationship between the button switches SW and the corresponding indicators ID is clear, and the button switches SW can be smoothly operated without error from this aspect as well.

According to the embodiment described above, an eave 49 is formed so as to encircle the display panel 43, and the eave 49 is inclined so that the front end on the side farthest from the driver seat 9 in the left-to-right direction is elevated, that the eave 49 gradually descends from the front end toward the driver seat 9 in the left-to-right direction, and that the eave 49 also gradually descends rearward from the front end. Therefore, it is possible to prevent situations in which the display panel 43 is difficult to see due to external light coming in at an angle, the display panel 43 portion has a superior design with a varied shape, and the outward appearance of the display panel 43 portion is improved.

According to the embodiment described above, since the printed display unit 46 is formed with a background color similar to that of the liquid crystal display unit 45 so that the printed display unit 46 and the liquid crystal display unit 45 appear to be a single continuous display unit, the entire display panel 43 has an improved appearance and an adequate aesthetic appeal because the liquid crystal display unit 45 and the printed display unit 46 are combined to appear as one large display unit.

Moreover, the liquid crystal display unit 45 displays black colors on a white background, the printed display unit 46 is provided so as to encircle the external periphery of the liquid crystal display unit 45, the printed display unit 46 is formed with a white background similar to the background color of the liquid crystal display unit 45, and black display printing is used. Therefore, the liquid crystal display unit 45 appears to be larger throughout its entire periphery.

A light-blocking printed unit 47 is provided so as to encircle the external peripheries of the liquid crystal display unit 45 and printed display unit 46; a transparent plate 50 is provided over the light-blocking printed unit 47, the printed display unit 46, and the liquid crystal display unit 45; a light-blocking printed element 51 is created in the external periphery of the transparent plate 50 so as to form the light-blocking printed unit 47; a white background printed element 52 for forming the background color of the printed display unit 46 is created inward of the light-blocking printed element 51 of the transparent plate 50; and a liquid crystal panel (LCD) for forming the liquid crystal display unit 45 is disposed inside the middle of the transparent plate 50. Therefore, a sense of integration is created by the common transparent plate 50 in the light-blocking printed unit 47, the printed display unit 46, and the liquid crystal display unit 45; and the entire display panel 43 appears as one large display screen from this aspect as well, creating an adequate aesthetic appeal.

The light-blocking printed element 51 for forming the light-blocking printed unit 47, as well as the white background printed element 52 for forming the background color of the printed display unit 46, are placed apart from each other on the front and rear surfaces of the transparent plate 50. Therefore, a sense of depth and solidity is created in the display of the display panel 43, and an adequate aesthetic appeal is created in the display panel 43 from this respect as well.

In the embodiment previously described, a pair of left and right operating members 25 is provided for operating the attachment A mounted on the work vehicle 1. Alternatively, a single operating member 25 for operating the attachment A mounted on the work vehicle 1 may be provided, or three or more may be provided.

In the embodiment previously described, the attachment A mounted on the work vehicle 1 is operated by swinging the volume switches 27 on the operating members 25 to the left and right. Alternatively, the attachment A may be operated by swinging the operating levers 26 on the operating members 25 forward and backward or left and right, in which case the switch symbols D27 may be omitted from the operating member symbols D25 that is displayed on the liquid crystal display unit 45 and shows the operating members 25, and the operating member symbols D25 may show the operating lever symbols D26 alone.

In the embodiment previously described, the attachment A mounted on the work vehicle is an attachment apparatus, and the maximum flow rate levels ML of hydraulic oil supplied to and drained from the actuators 31, 32 are displayed on the liquid crystal display unit 45, but booms, arms, and other attachment apparatuses of backhoes, front loaders, and other work vehicles may be operated aside from the attachment A of a backhoe by operating levers and other operating members, and the liquid crystal display unit 45 may display the maximum flow rate levels ML of hydraulic oil supplied to and drained from the actuators of the booms, arms, and other attachment apparatuses.

In the embodiment previously described, the display unit for variably displaying the maximum flow rate levels ML and the like is configured from a liquid crystal display unit 45. Alternatively, the display unit for variably displaying the maximum flow rate levels ML and the like may be configured from an organic EL panel or another variable display unit.

In the embodiment previously described, the display panel 43 is provided in front and to the right of the driver seat 9, and the eave 49 is inclined so that the right front part is elevated, that the eave 49 gradually descends to the left from the right front part, and that the eave 49 also gradually descends rearward from the right front part. Alternatively, the display panel 43 may be provided in front and to the left of the driver seat 9, in which case the eave 49 can be inclined so that the left front part is elevated, that the eave 49 gradually descends to the right from the left front part, and the eave 49 also gradually descends rearward from the left front part.

What is claimed is:

1. A display device for a work vehicle, comprising:
    a variable display unit capable of varying display contents; and
    a printed display unit disposed adjacent to the variable display unit;
    wherein the variable display unit is configured so that a variable display is displayed in a black color on a white background, the printed display unit is formed with a white background similar to the background color of the variable display unit, and black fixed displays are created so that the printed display unit appears as a single display unit continuous with the variable display unit;
    wherein a light-blocking printed unit is provided adjacent to the printed display unit; a transparent plate is provided over the light-blocking printed unit, the printed display unit, and the variable display unit; a light-blocking printed element is created on the transparent plate so as to form the light-blocking printed unit; a white background printed element for forming the background color of the printed display unit is created; and a liquid crystal panel is disposed inside the transparent plate in order to form the variable display unit;
    wherein the light-blocking printed element for forming the light-blocking printed unit and the white background printed element for forming the background color of the printed display unit are placed apart from each other on the front and rear surfaces of the transparent plate;
    wherein the printed display unit is disposed adjacent to a lateral outer side of the variable display unit, a fixed display being created on the printed display unit;

wherein a variable display that indicates a value of a variable parameter of the vehicle is disposed on a lateral outer side of the variable display unit adjacent to the fixed display; and wherein the fixed display comprises at least one graphic representation identifying the variable parameter of the variable display disposed adjacent thereto.

2. The display device for a work vehicle of claim 1, wherein the variable display comprises a vertically extending level indicator and the graphic representation of the fixed display comprises two vertically spaced representations that indicate a high level and a low level of the value of the variable parameter.

3. The display device for a work vehicle of claim 2, wherein the variable parameter is an amount of fuel in a fuel tank of the work vehicle.

4. The display device for a work vehicle of claim 2, wherein the variable parameter is an engine temperature.

5. The display device for a work vehicle of claim 1, wherein:

a plurality of button switches is aligned adjacent to the variable display unit, and a plurality of switch function displays for showing the respective functions of the button switches is displayed in the vicinity of the variable display unit near the button switches; and the switch function displays and the corresponding button switches are misaligned from each other in parallel directions, dividing lines are provided between the button switches, the button switches are disposed between adjacent dividing lines, and the dividing lines are formed so that the switch function displays corresponding to the button switches are positioned above and between the ends of the dividing lines on the side proximal to the variable display unit.

6. The display device for a work vehicle of claim 5, wherein:

indicators corresponding to the button switches are provided, and the indicators are disposed between adjacent dividing lines where the corresponding button switches are also disposed.

7. The display device for a work vehicle of claim 5, wherein:

the dividing lines are parallel to each other and are disposed so as to be inclined in relation to the variable display unit.

8. The display device for a work vehicle of claim 5, wherein:

dividing lines are provided between adjacent switch function displays of the variable display unit, and the dividing lines are formed so as to be continuous with the corresponding dividing lines.

9. A display device for a work vehicle, comprising:

a variable display unit capable of varying display contents; and a printed display unit disposed adjacent to the variable display unit;

wherein a transparent plate is provided over a light-blocking printed unit, the printed display unit, and the variable display unit; the printed display unit is formed with a background color similar to that of the variable display unit so that the printed display unit appears as a single display unit continuous with the variable display unit; and a liquid crystal panel is disposed inside the transparent plate in order to form the variable display unit;

wherein the printed display unit is disposed adjacent to a lateral outer side of the variable display unit, a fixed display being created on the printed display unit;

wherein a variable display that indicates a value of a variable parameter of the vehicle is disposed on a lateral outer side of the variable display unit adjacent to the fixed display; and wherein the fixed display comprises at least one graphic representation identifying the variable parameter of the variable display disposed adjacent thereto.

10. The display device for a work vehicle of claim 9, wherein the variable display comprises a vertically extending level indicator and the graphic representation of the fixed display comprises two vertically spaced representations that indicate a high level and a low level of the value of the variable parameter.

11. The display device for a work vehicle of claim 10, wherein the variable parameter is an amount of fuel in a fuel tank of the work vehicle.

12. The display device for a work vehicle of claim 10, wherein the variable parameter is an engine temperature.

* * * * *